(12) United States Patent
Fukuno et al.

(10) Patent No.: US 7,745,964 B2
(45) Date of Patent: Jun. 29, 2010

(54) BRUSHLESS MOTOR

(75) Inventors: Fumio Fukuno, Kosai (JP); Tatsuya Kawai, Kosai (JP); Masashi Matsuda, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 217 days.

(21) Appl. No.: 12/153,631

(22) Filed: May 22, 2008

(65) Prior Publication Data
US 2008/0296985 A1     Dec. 4, 2008

(30) Foreign Application Priority Data
May 31, 2007     (JP)     ............... 2007-145038

(51) Int. Cl.
*H02K 5/24*     (2006.01)
(52) U.S. Cl. .................... 310/51; 310/216.43
(58) Field of Classification Search .................. 310/51, 310/216.131, 216.43–216.44
See application file for complete search history.

(56) References Cited

U.S. PATENT DOCUMENTS

| | | | |
|---|---|---|---|
| 5,306,123 A * | 4/1994 | Day et al. ............... | 417/423.7 |
| 6,844,636 B2 * | 1/2005 | Lieu et al. .................. | 310/43 |
| 7,659,644 B2 * | 2/2010 | Fukuno et al. ............. | 310/51 |
| 2006/0175926 A1 * | 8/2006 | Best ........................ | 310/254 |
| 2007/0222326 A1 * | 9/2007 | Ionel et al. ................ | 310/216 |
| 2007/0267924 A1 * | 11/2007 | Dellinger .................. | 310/51 |
| 2008/0024019 A1 * | 1/2008 | Sakuma et al. ............. | 310/51 |
| 2008/0143198 A1 * | 6/2008 | Bi et al. .................... | 310/51 |

FOREIGN PATENT DOCUMENTS

| JP | U-H02-146980 | 12/1990 |
|---|---|---|
| JP | B2-3051827 | 3/2000 |

* cited by examiner

*Primary Examiner*—Thanh Lam
(74) *Attorney, Agent, or Firm*—Posz Law Group, PLC

(57) ABSTRACT

In a brushless motor, a stator includes an annular core member. A rotatable shaft is placed radially inward of the core member and extends in an axial direction. A rotor is supported by the rotatable shaft. A centerpiece supports the core member and includes a center portion, which is placed radially inward of the core member. A platy vibration absorbing member connects between the core member and the center portion of the centerpiece and damps circumferential vibrations transmitted from the core member.

13 Claims, 27 Drawing Sheets

US 7,745,964 B2

BRUSHLESS MOTOR

CROSS REFERENCE TO RELATED APPLICATION

This application is based on and incorporates herein by reference Japanese Patent Application No. 2007-145038 filed on May 31, 2007.

BACKGROUND OF THE INVENTION

1. Field of the Invention

The present invention relates to a brushless motor.

2. Description of Related Art

For example, Japanese Patent No. 3051827 discloses a brushless motor, which includes a vibration absorber. In the brushless motor of Japanese Patent No. 3051827, a vibration isolation rubber is interposed between a motor fixing flange and a stator.

However, in this kind of brushless motor, the vibration absorbing member made of the resilient member (e.g., rubber, spring) is installed in a motor main body. Thus, unbalanced vibrations of the motor main body may possibly be promoted to increase rotational primary vibrations. Therefore, it has been demanded to reduce motor vibration without increasing the unbalanced vibrations of the motor main body.

SUMMARY OF THE INVENTION

The present invention addresses the above disadvantage. According to one aspect of the present invention, there is provided a brushless motor, which includes a stator, a rotatable shaft, a rotor, a centerpiece and a platy vibration absorbing member. The stator includes an annular core member. The rotatable shaft is placed radially inward of the core member and extends in an axial direction. The rotor is supported by the rotatable shaft. The centerpiece supports the core member and includes a center portion, which is placed radially inward of the core member. The vibration absorbing member connects between the core member and the center portion of the centerpiece and damps circumferential vibrations transmitted from the core member.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 14.

Figure 1:
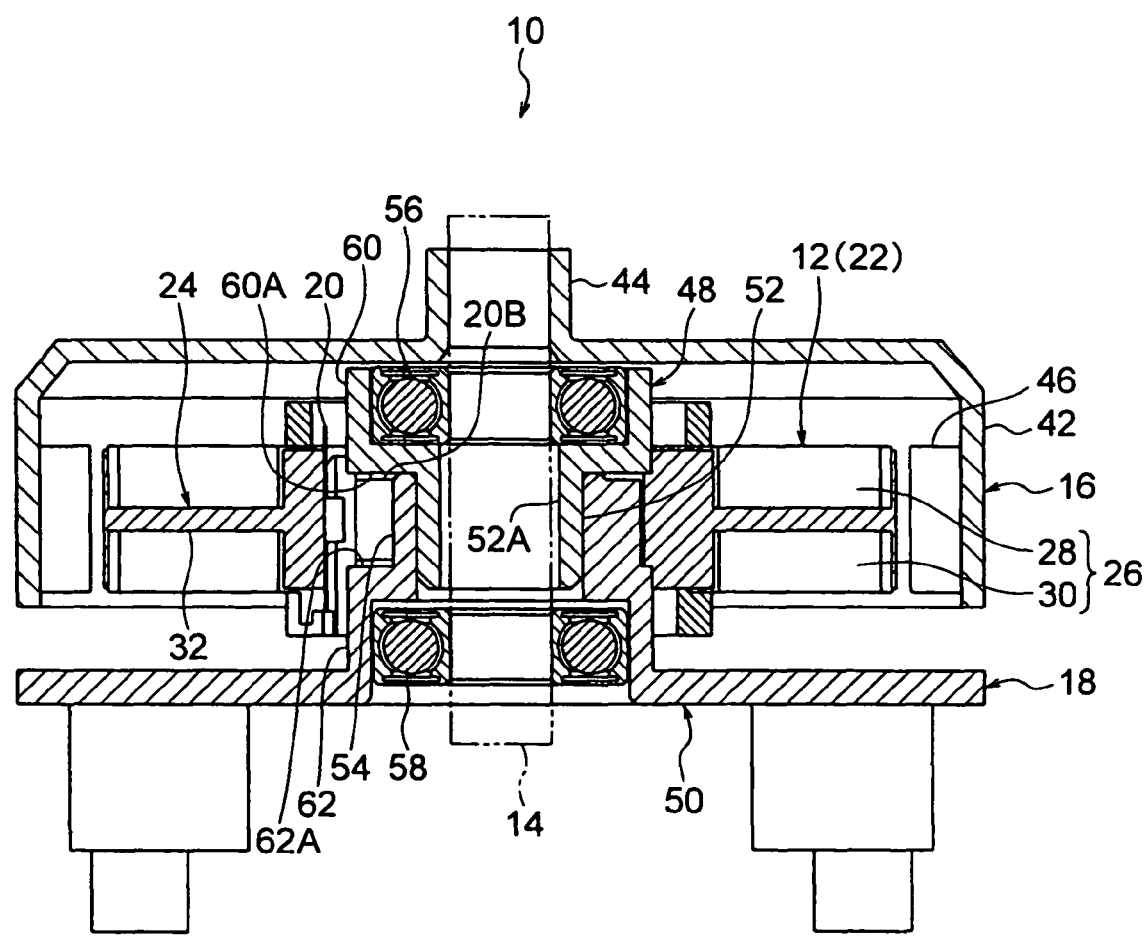
FIG. 1 is a cross sectional view of a brushless motor according to a first embodiment of the present invention.

FIG. 1 shows a structure of a brushless motor 10 according to the first embodiment of the present invention. The brushless motor 10 shown in FIG. 1 is applied, for example, as a blower motor of an air conditioning system of a vehicle (e.g., an automobile) or a fan motor, which is used to cool a radiator of the vehicle. The brushless motor 10 includes a stator 12, a rotatable shaft 14, a rotor 16, a centerpiece 18 and a plurality of platy vibration absorbing members (vibration damping members) 20.

Figure 2:
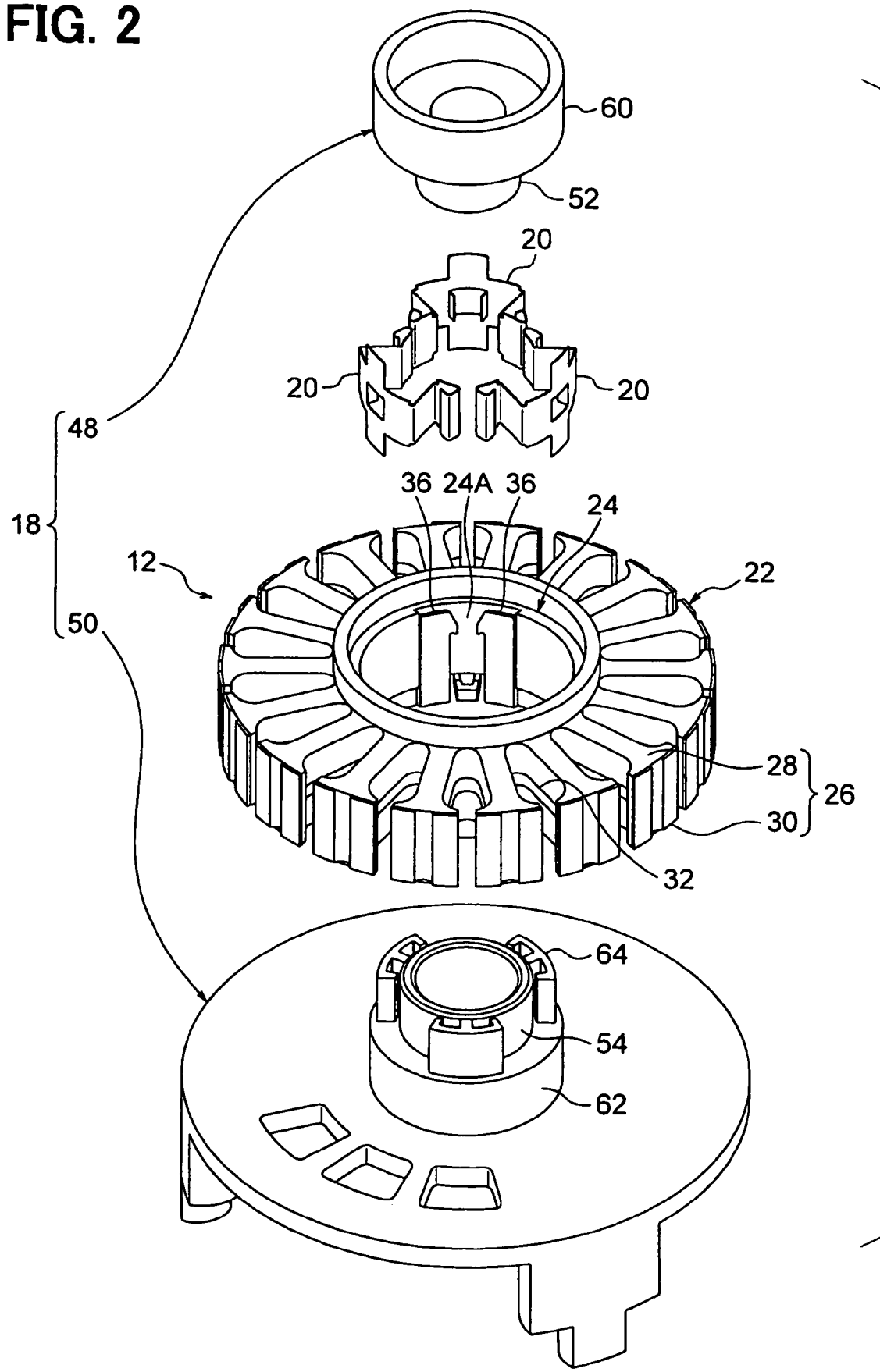
FIG. 2 is an exploded perspective view showing a part of the brushless motor shown in FIG. 1.

As shown in FIGS. 1 and 2, the stator 12 includes an annular core member 22. The core member 22 includes a laminated core 24 and an insulator 26. The insulator 26 includes an upper insulator segment 28 and a lower insulator segment 30, which are axially divided from each other and are axially installed to the laminated core 24 from opposite axial sides, respectively, of the laminated core 24. In FIGS. 1 and 2, windings (not depicted for the sake of simplicity) are wound around salient poles 32 of the laminated core 24 through the insulator 26.

Figure 3A:
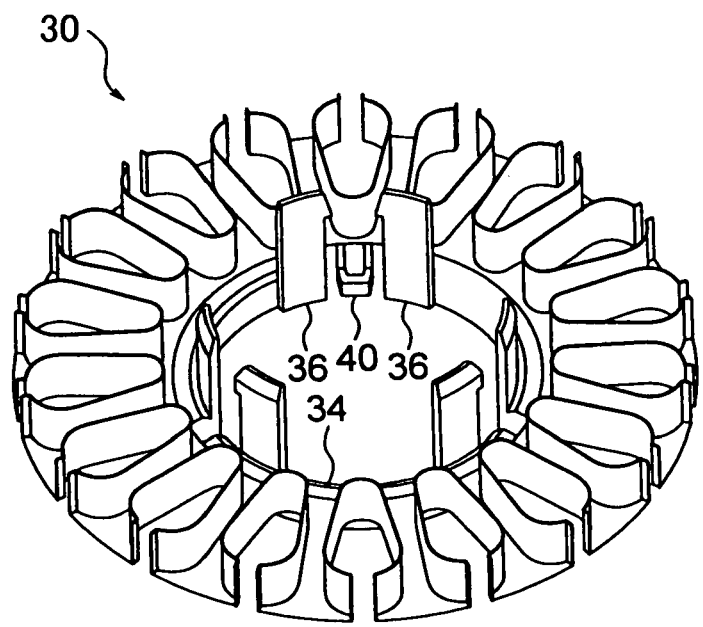
FIG. 3A is a top perspective view of a lower insulator segment of an insulator of a core member of FIG. 2.
Figure 3B:
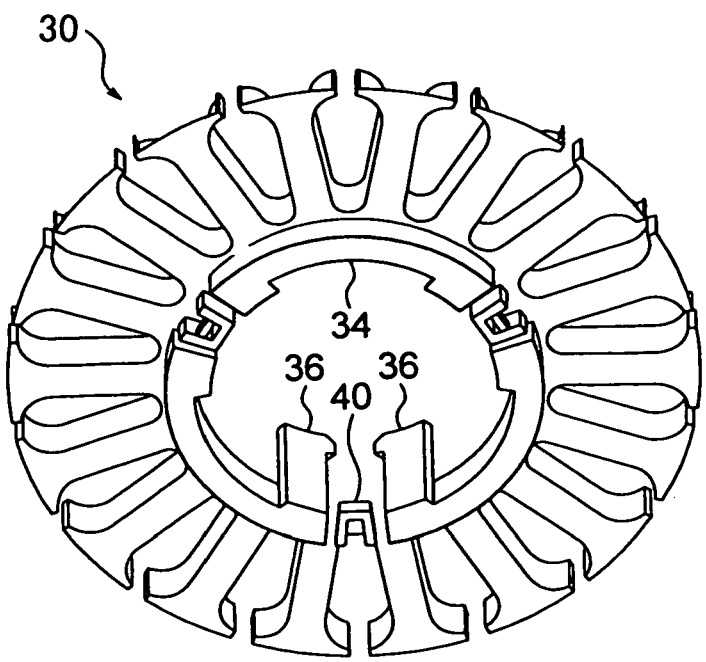
FIG. 3B is a bottom perspective view of the lower insulator segment.

As shown in FIGS. 3A and 3B, an annular portion 34 is provided in the lower insulator segment 30 to extend in the circumferential direction. Three pairs of opposing wall portions 36 are provided in the annular portion 34 at generally equal intervals in the circumferential direction. Each opposing wall portion 36 axially upwardly protrudes from the annular portion 34 in FIG. 3A. As shown in FIG. 2, in the installed state where the insulator 26 is installed to the laminated core 24, each opposing wall portion 36 is radially opposed to an inner peripheral surface 24A of the laminated core 24.

Figure 5A:
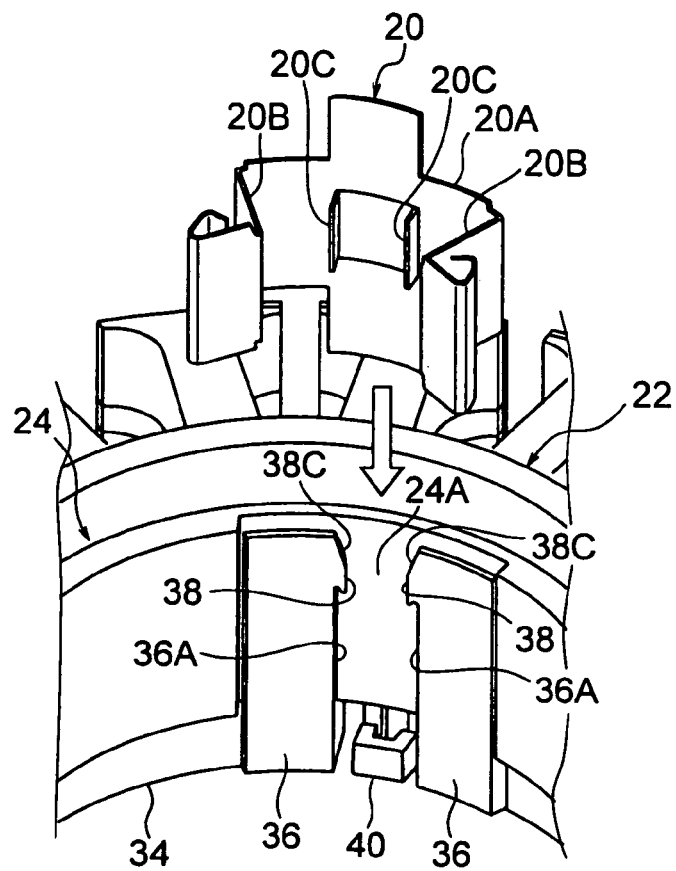
FIG. 5A is a descriptive view showing an initial state of a process of installing the vibration absorbing member to the core member of FIG. 2.
Figure 5B:
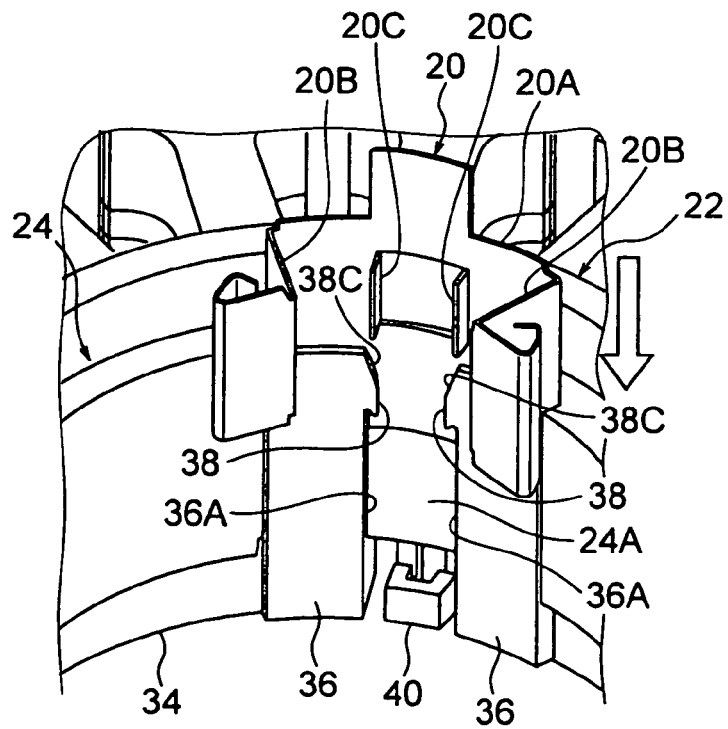
FIG. 5B is a descriptive view showing a subsequent state of the process of installing the vibration absorbing member after the state of FIG. 5A.
Figure 7A:
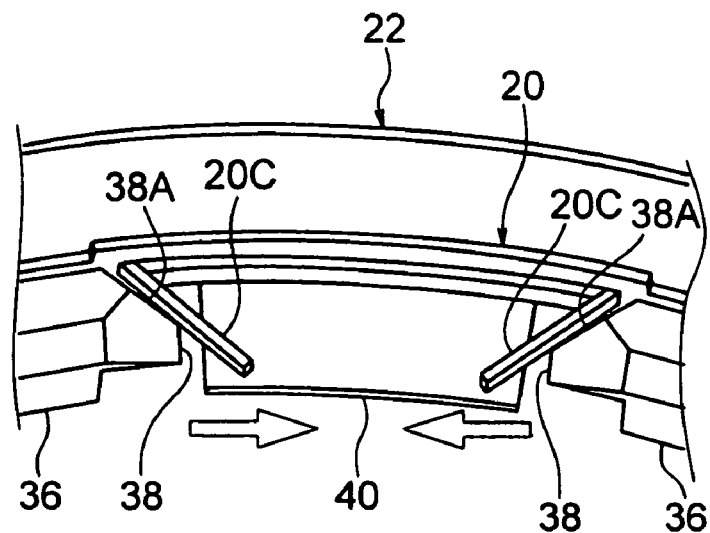
FIG. 7A is a plan view showing the structure of FIG. 6A.

Furthermore, as shown in FIGS. 5A and 5B, in each pair of opposing wall portions 36, a lateral edge portion 36A is formed to extend in the axial direction along each of circumferentially opposed lateral edges of the opposing wall portions 36. A stopper 38 is formed at an upper part of each of the circumferentially opposed edge portions 36A such that the stoppers 38 of the circumferentially opposed lateral edge portions 36A circumferentially protrude toward each other. As shown in FIG. 7A, a portion of each stopper 38, which is located at a projecting end side and a radially outer side of the stopper 38, is chamfered (tapered) to form a guide surface 38A, which guides an engaging piece 20C of the corresponding vibration absorbing member 20.

Figure 7B:
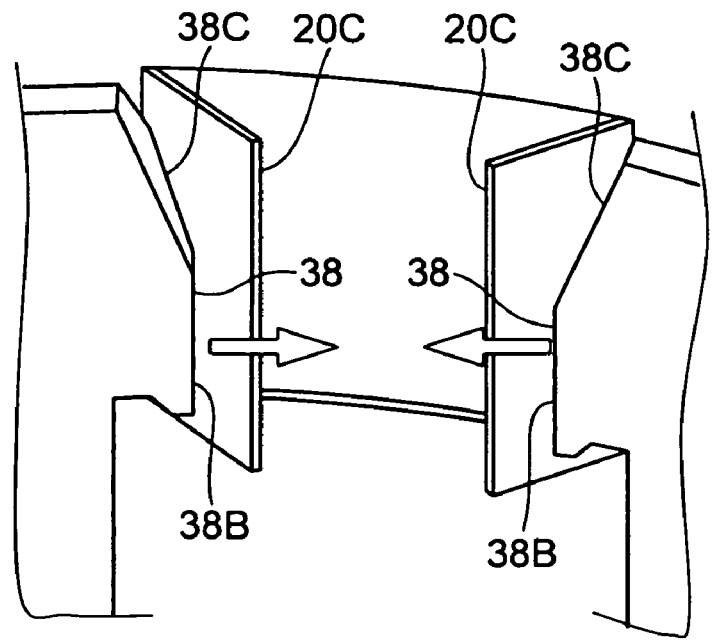
FIG. 7B is a perspective view showing the structure of FIG. 7A.

Furthermore, as shown in FIG. 7B, an axially extending edge portion 38B is formed to extend along each of circumferentially opposed sides of the circumferentially opposed stoppers 38. A tilted portion 38C is formed on an upper side of the edge portion 38B of each of the stoppers 38 such that a circumferential distance between the tilted portions 38C of the stoppers 38 is reduced toward the axially lower side in FIG. 7B. As shown in FIGS. 3A and 3B, the annular portion 34 of the lower insulator segment 30 has resilient urging pieces 40, each of which is configured into a tongue shape and is circumferentially placed between the opposing wall portions 36 of the corresponding pair to extend radially inward.

As shown in FIG. 1, the rotor 16 includes a cup-shaped rotor housing 42. A tubular fitting portion 44 is formed at the center of the bottom of the rotor housing 42 to receive a distal end portion of the rotatable shaft 14. Furthermore, rotor magnets 46 are fixed to an inner peripheral surface of a cylindrical portion of the rotor housing 42.

As shown in FIGS. 1 and 2, the centerpiece 18 includes an upper centerpiece segment (a first centerpiece segment) 48 and a lower centerpiece segment (a second centerpiece segment) 50, which are axially divided from one another. The upper centerpiece segment 48 has a shaft portion 52 at the center thereof. Furthermore, the lower centerpiece segment 50 has a shaft portion 54 (a center portion) at the center thereof. A cup-shaped bearing receiving portion 60 is integrally provided to the shaft portion 52 of the upper centerpiece segment 48 and receives a bearing member 56. A cup-shaped bearing receiving portion 62 is integrally provided in the shaft portion 54 of the lower centerpiece segment 50 and receives a bearing member 58.

Figure 12A:
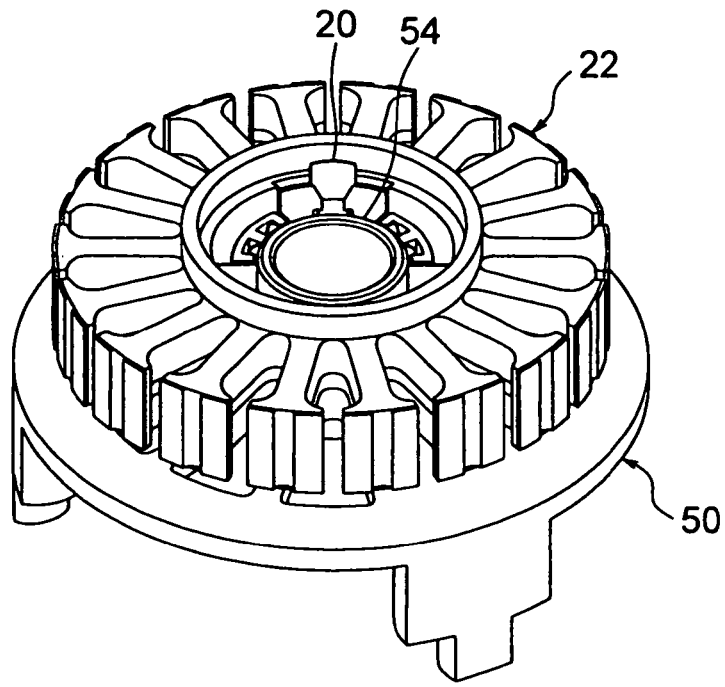
FIG. 12A is a top perspective view showing the vibration absorbing members and the core member installed to the lower centerpiece segment shown in FIG. 2.
Figure 12B:
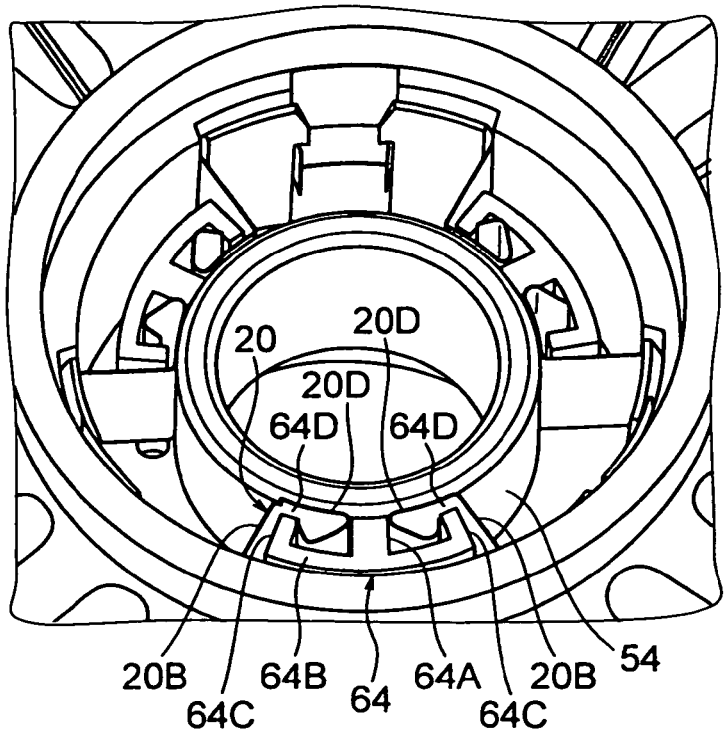
FIG. 12B is an enlarged perspective view showing a portion of FIG. 12A.

Furthermore, as shown in FIG. 2, anchors 64 are provided at generally equal intervals in the circumferential direction along an outer peripheral surface of the shaft portion 54 of the lower centerpiece segment 50. As shown in FIG. 12B, each anchor 64 includes a support pillar 64A (serving as a primary anchoring portion), a circumferential wall 64B, two protrusions 64C (serving as secondary anchoring portions). The support pillar 64A projects radially outward from the outer peripheral surface of the shaft portion 54. The circumferential wall 64B is provided to a radially outer end of the support pillar 64A and extends in the circumferential direction. The protrusions 64C are provided to two circumferential ends, respectively, of the circumferential wall 64B, to protrude radially inwardly. A gap 64D is formed between each protrusion 64C and the outer peripheral surface of the shaft portion 54.

Figure 4A:
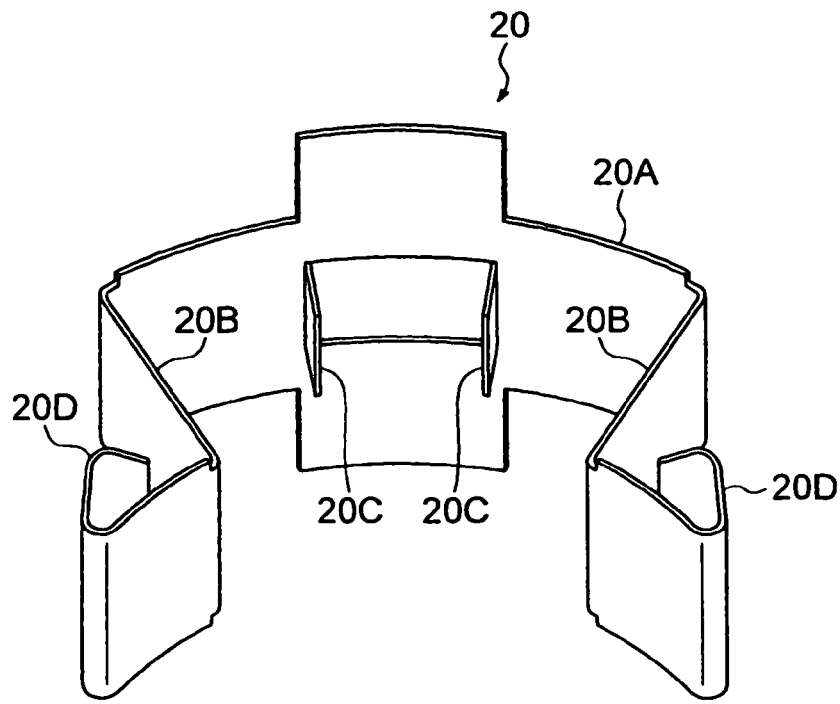
FIG. 4A is a perspective view of a vibration absorbing member of FIG. 2.
Figure 4B:
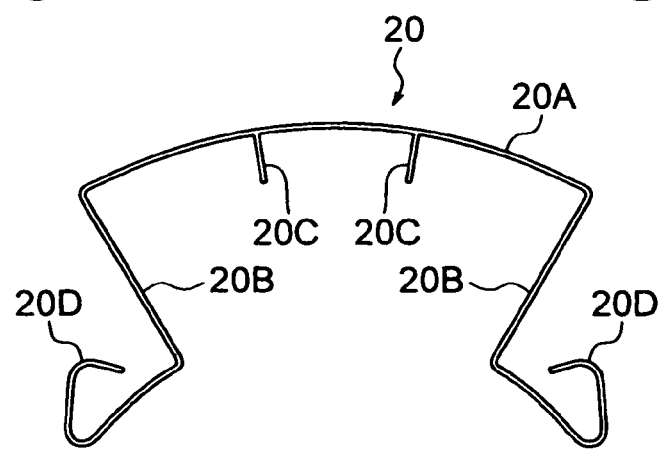
FIG. 4B is a plan view of the vibration absorbing member of FIG. 4A.
Figure 4C:
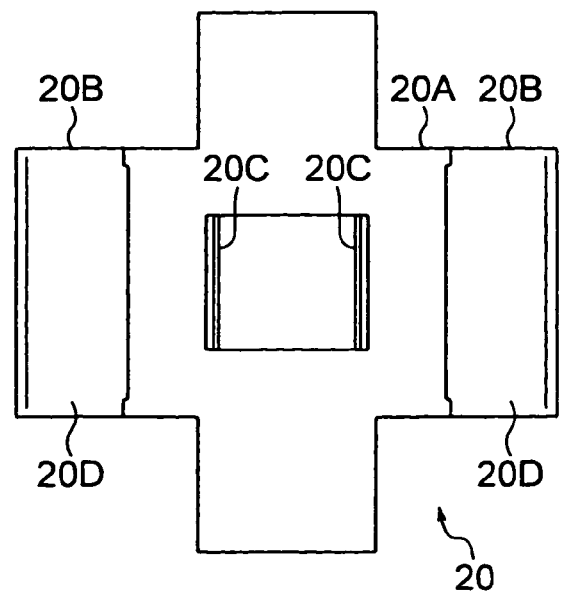
FIG. 4C is a front view of the vibration absorbing member of FIGS. 4A and 4B.

As shown in FIGS. 4A to 4C, each vibration absorbing member 20 is made of a plate spring, which is formed by, for example, stamping a corresponding part from a metal plate through press working. The vibration absorbing member 20 includes a base portion 20A and two resilient pieces 20B. The base portion 20A extends in the circumferential direction. The resilient pieces 20B are formed at circumferential ends of the base portion 20A such that each resilient piece 20B is radially inwardly bent from the base portion 20A and extends in the axial direction to have a corresponding axial width.

Two engaging pieces 20C are formed in a center portion of the base portion 20A such that corresponding two parts of the center portion of the base 20A are cut and are then bent radially inward. Furthermore, a protruding end portion of each resilient piece 20B is folded back to form an anchoring portion 20D, which is engaged with the anchor 64.

The brushless motor 10 is assembled as follows.

First, as shown in FIGS. 5A to 9, the vibration absorbing members 20 are axially downwardly installed to the core member 22, which has been previously assembled by installing the insulator 26 to the laminated core 24. At this time, first, as shown in FIG. 5A, the vibration absorbing member 20 is placed above the corresponding opposing wall portions 36. Then, as shown in FIG. 5B, the base portion 20A of the vibration absorbing member 20 is inserted between the inner peripheral surface 24A of the laminated core 24 and the corresponding opposing wall portions 36, and the vibration absorbing member 20 is slid axially downwardly relative to the core member 22. When the vibration absorbing member 20 is slid axially downwardly relative to the core member 22, the engaging pieces 20C of the vibration absorbing member 20 are slidably engaged with the tilted portions 38C, respectively, of the opposing wall portions 36, so that the engaging pieces 20C are bent along the tilted portions 38C.

Figure 6A:
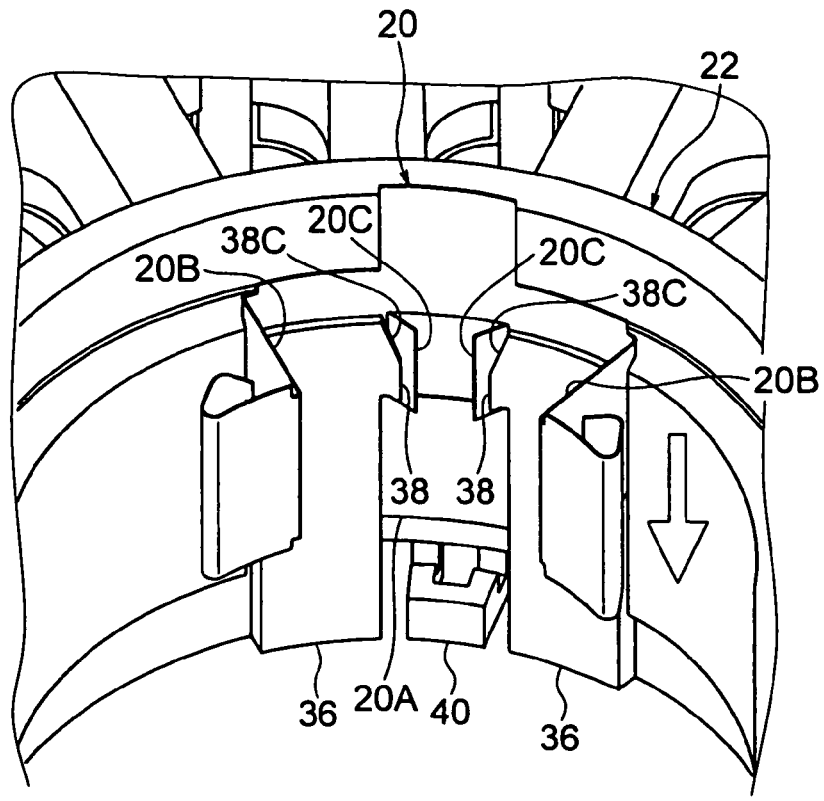
FIG. 6A is a descriptive view showing a next state of the process of installing the vibration absorbing member after the state of FIG. 5B.

In this state, when the vibration absorbing member 20 is slid further axially downwardly relative to the core member 22, the engaging pieces 20C are slidably engaged with the guide surfaces 38A of the opposing wall portions 36, as shown in FIGS. 6A and 7A. Then, when the vibration absorbing member 20 is further slid axially downwardly relative to the core member 22, the engaging pieces 20C are axially downwardly guided along the guide surfaces 38A while being bent (see FIG. 7B). At this time, the engaging pieces 20C are placed in the resiliently deformed state.

Figure 6B:
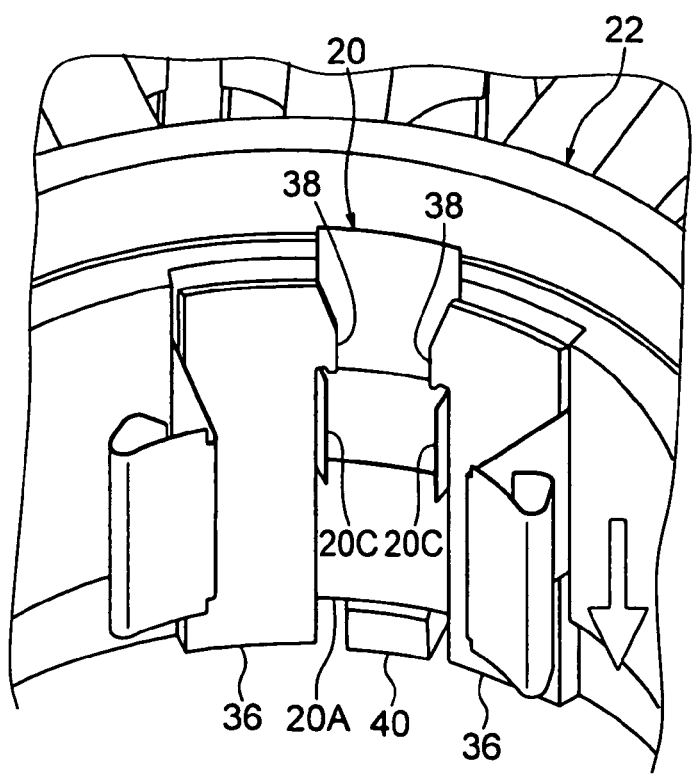
FIG. 6B is a descriptive view showing a complete state of the process of installing the vibration absorbing member after the state of FIG. 6A.

Then, when the vibration absorbing member 20 is further slid axially downwardly relative to the core member 22, the engaging pieces 20C are moved beyond the guide surfaces 38A. Thus, as shown in FIG. 6B, the engaging pieces 20C are snapped back due to its resilient force, so that the engaging pieces 20C are restored into the perpendicular state, in which the engaging pieces 20C are placed generally perpendicular to the base portion 20A.

Figure 8A:
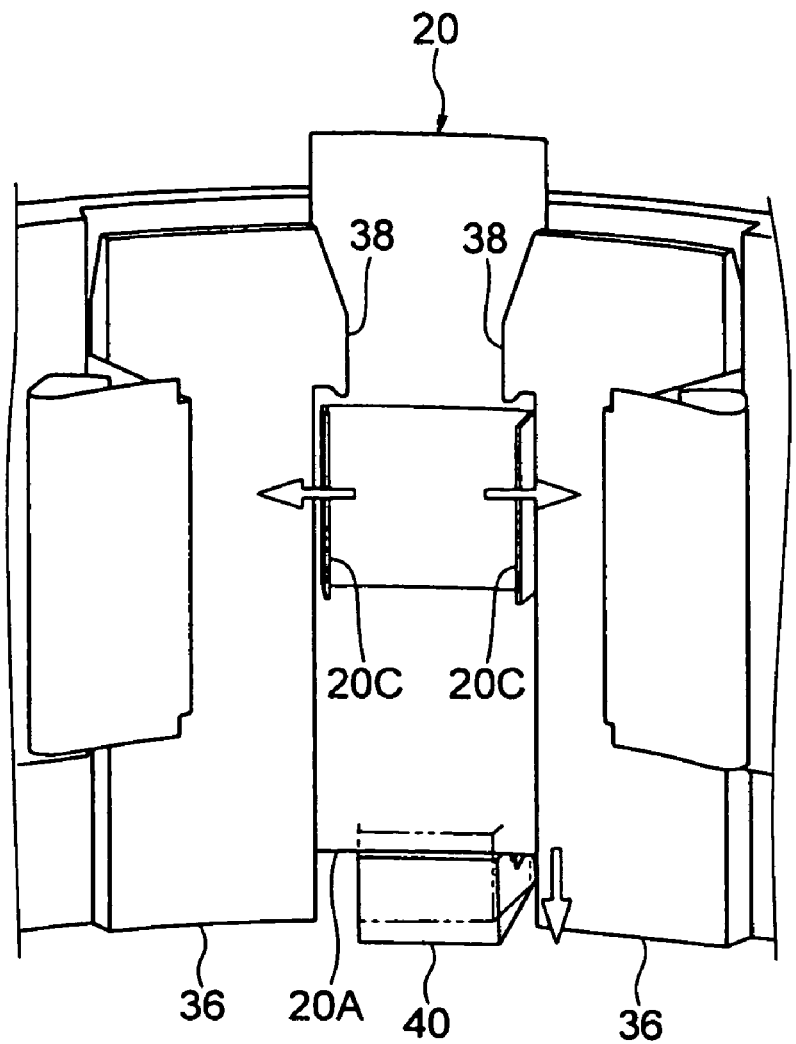
FIG. 8A is a top perspective view showing the structure of FIG. 6B.
Figure 8B:
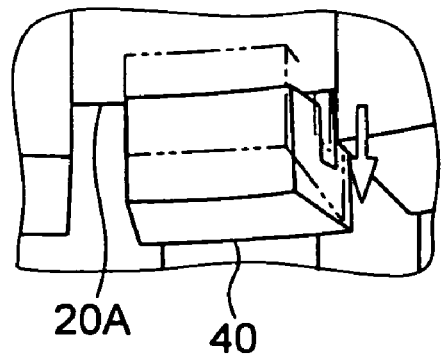
FIG. 8B is a bottom perspective view showing the structure of FIG. 8A.

Furthermore, as shown in FIGS. 8A and 8B, when the engaging pieces 20C are restored into the perpendicular state, in which the engaging pieces 20C are spaced from the guide surfaces 38A and are placed generally perpendicular to the base portion 20A, the lower edge of the base portion 20A urges the resilient urging piece 40, so that the resilient urging piece 40 is resiliently deformed axially downwardly.

Figure 9:
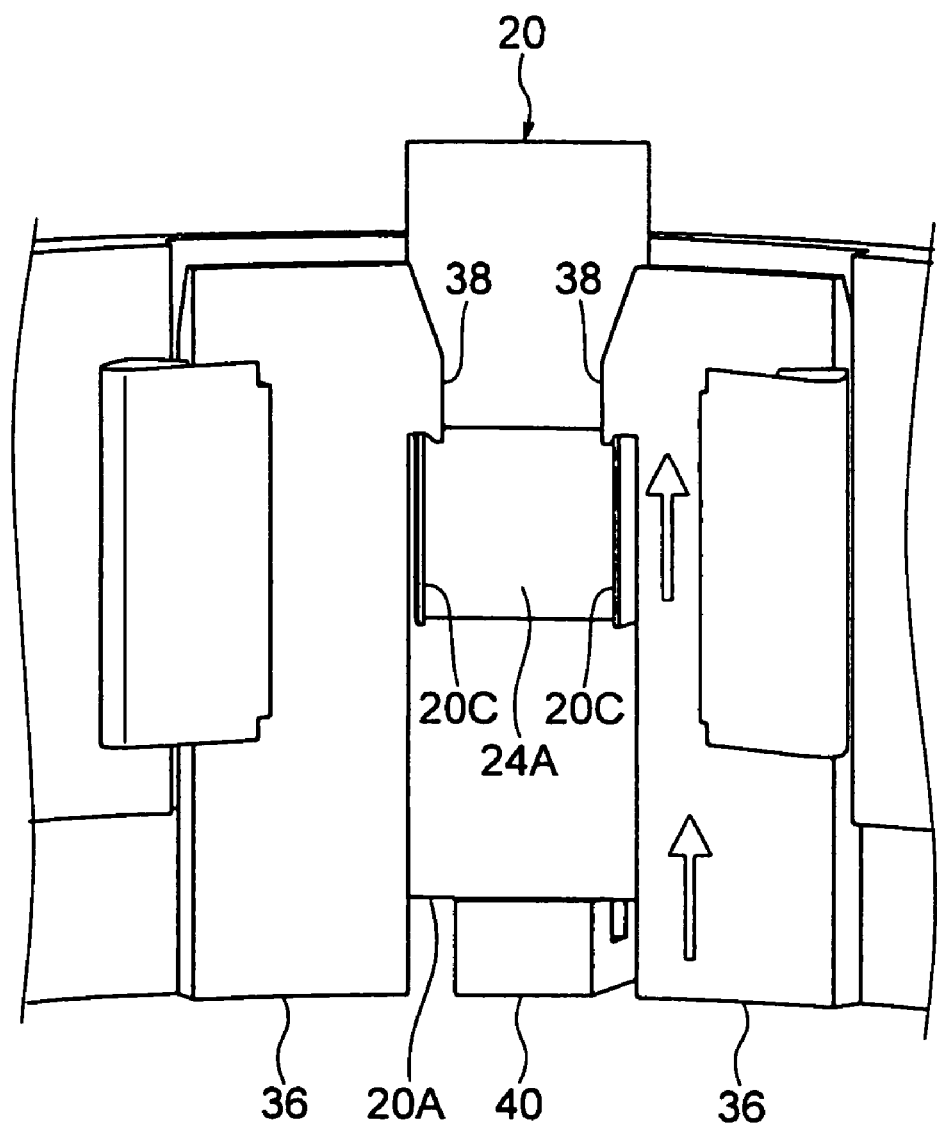
FIG. 9 is a partially enlarged perspective view showing the vibration absorbing member installed to the core member of FIG. 2.

Then, as shown in FIG. 9, when the resilient urging piece 40 is restored axially upwardly by the resilient force thereof, the reaction force of the resilient urging piece 40 is applied to the base portion 20A of the vibration absorbing member 20. Thereby, the axially upward urging force is applied to the base portion 20A of the vibration absorbing member 20. In this way, the engaging pieces 20C axially engage the stoppers 38, so that the axially upward movement of the vibration absorbing member 20 is limited. Furthermore, the resilient urging piece 40 engages the base portion 20A of the vibration absorbing member 20 from the axially lower side thereof, so that the axially downward movement of the vibration absorbing member 20 is also limited.

Furthermore, at this time, the base portion 20A of the vibration absorbing member 20 is radially interposed between the inner peripheral surface 24A of the laminated core 24 and the opposing wall portions 36. Thus, the radial movement of the vibration absorbing member 20 is also limited. Furthermore, when the engaging pieces 20C are restored into the perpendicular state, in which the engaging pieces 20C are placed generally perpendicular to the base portion 20A, the engaging pieces 20C are engaged between the opposing wall portions 36. Therefore, the circumferential movement of the vibration absorbing member 20 is also limited.

Figure 10A:
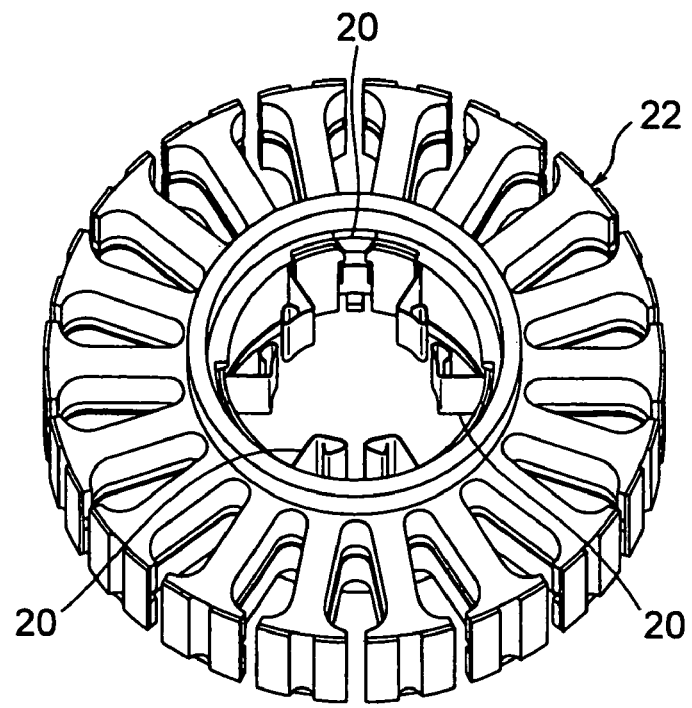
FIG. 10A is a top perspective view showing the vibration absorbing members installed to the core member of FIG. 2.
Figure 10B:
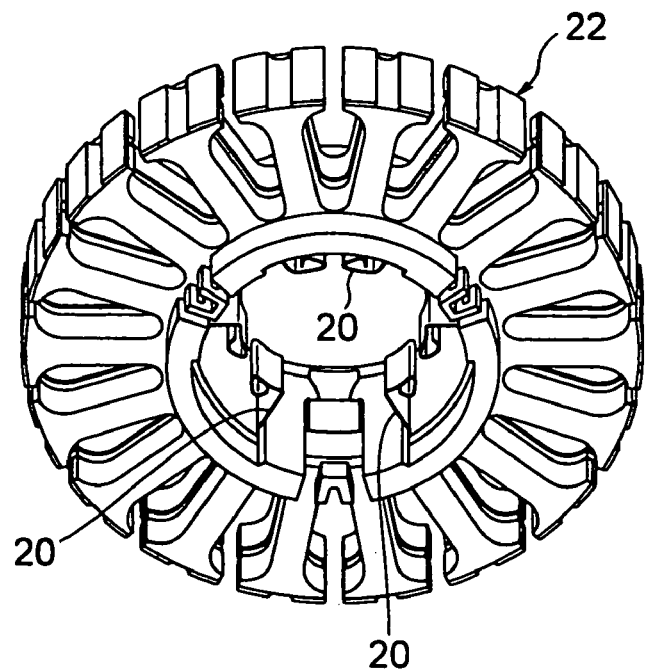
FIG. 10B is a bottom perspective view showing the structure of FIG. 10A.

When each vibration absorbing member 20 is installed to the core member 22 in the above described manner, the vibration absorbing members 20 are placed one after another at generally equal intervals in the circumferential direction, as shown in FIG. 10.

Figure 11:
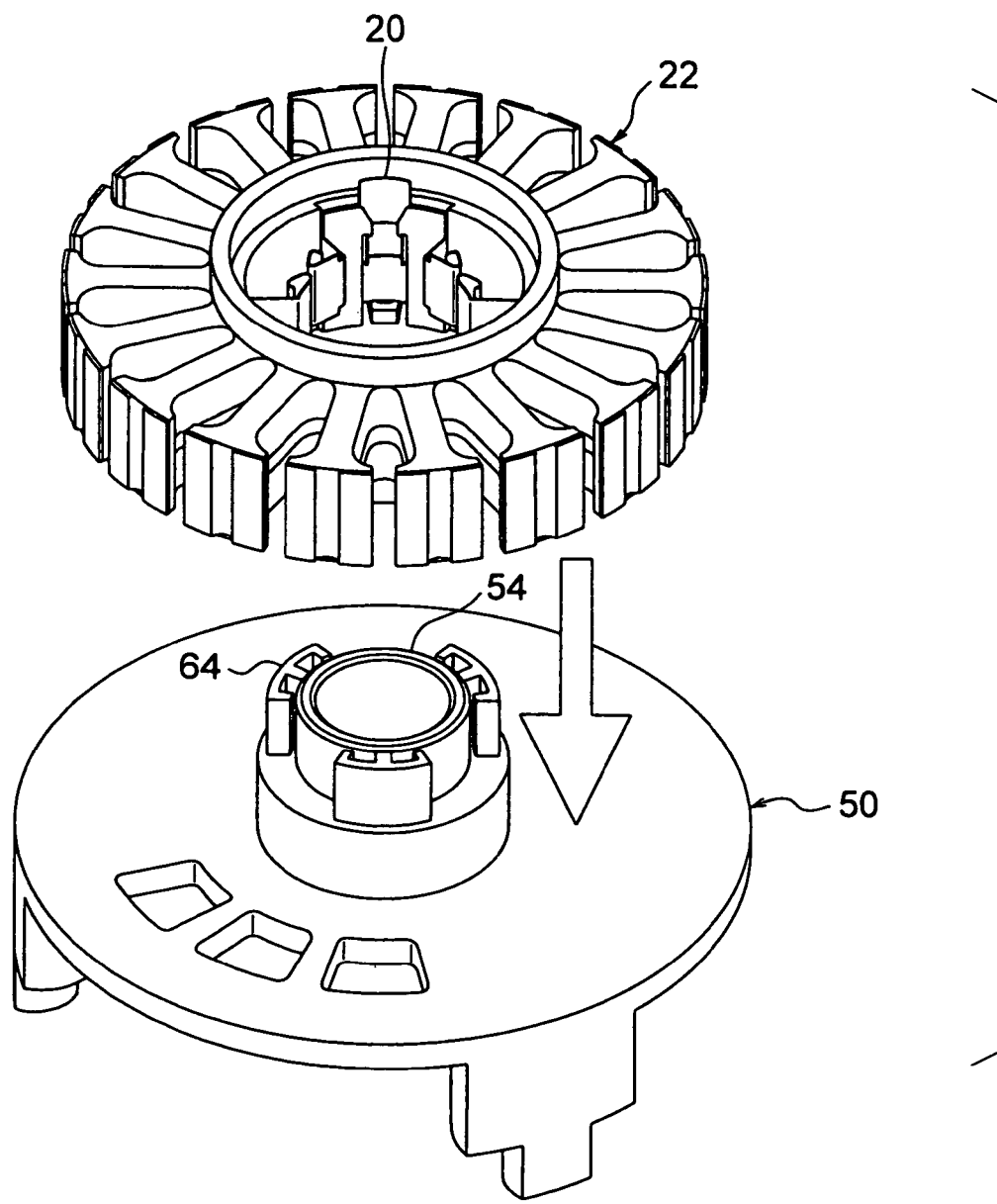
FIG. 11 is a descriptive view showing a process of installing the vibration absorbing members and the core member to a lower centerpiece segment shown in FIG. 2.

Next, the core member 22, to which the vibration absorbing members 20 are installed, is installed to the lower centerpiece segment 50 from the axially upward thereof, as shown in FIG. 11. At this time, as shown in FIGS. 12A and 12B, the shaft portion 54 of the lower centerpiece segment 50 is placed radially inward of the core member 22, and each of the anchoring portions 20D, which are provided at the protruding end portions of the resilient pieces 20B of each vibration absorbing member 20, is inserted into a corresponding space, which is defined by the support pillar 64A, the circumferential wall 64B and the corresponding protrusion 64C of the corresponding anchor 64 formed in the shaft portion 54.

In this way, each anchoring portion 20D is engaged with the support pillar 64A and the protrusion 64C at one circumferential side and the other circumferential side of the anchoring portion 20D and is also engaged with the circumferential wall 64B and the outer peripheral surface of the shaft portion 54 at a radially outer side and a radially inner side, respectively, of the anchoring portion 20D. Furthermore, at this time, the resilient piece 20B, which has the corresponding axial width, is radially placed between the core member 22 and the shaft portion 54 to connect therebetween while the resilient piece 20B radially extends such that the resilient piece 20B is resiliently deformable in the circumferential direction to absorb, i.e., to damp the circumferential vibrations transmitted from the core member 22.

Figure 13:
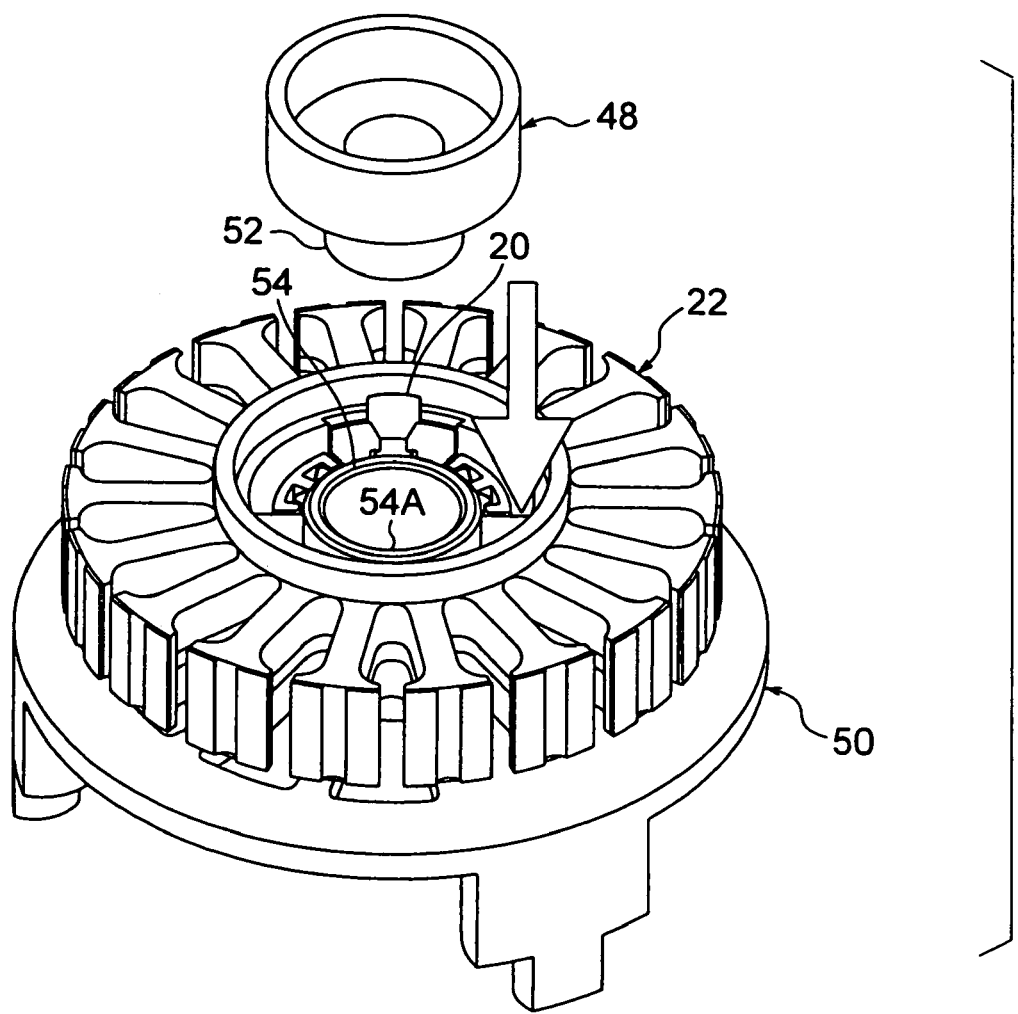
FIG. 13 is a descriptive view showing a process of installing an upper centerpiece segment to the vibration absorbing members, the core member and the lower centerpiece segment shown in FIG. 2.
Figure 14:
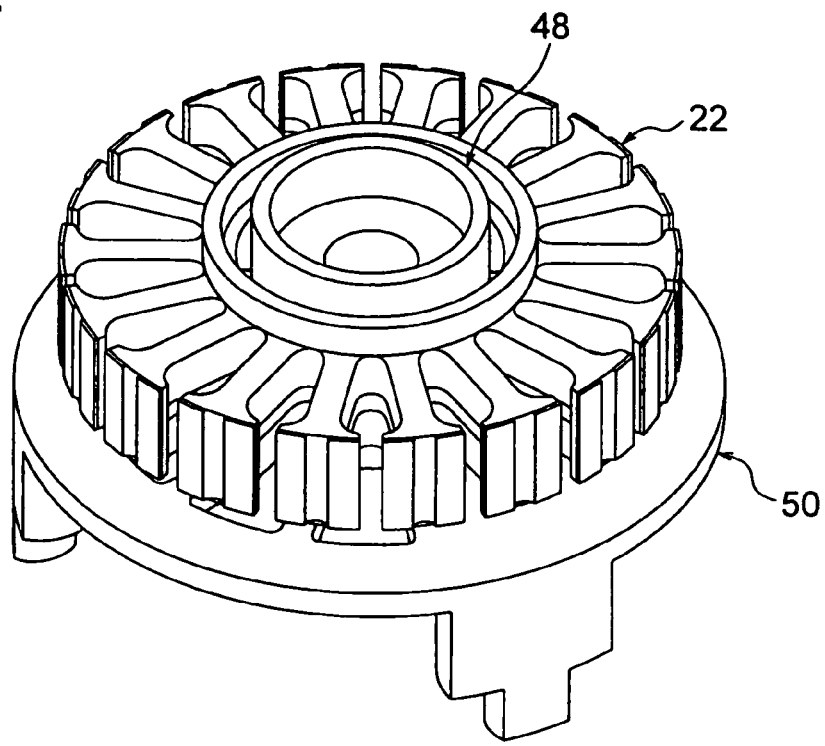
FIG. 14 is a perspective view showing the upper centerpiece segment installed to the vibration absorbing members, the core member and the lower centerpiece segment shown in FIG. 2.

Then, as shown in FIG. 13, the upper centerpiece segment 48 is installed to the lower centerpiece segment 50, which has the core member 22 installed thereto, from the axially upper side of the lower centerpiece segment 50. At this time, the shaft portion 52 of the upper centerpiece segment 48 is press fitted into a hole 54A of the shaft portion 54 of the lower centerpiece segment 50. In this way, as shown in FIG. 14, the upper centerpiece segment 48 is integrally fixed to the lower centerpiece segment 50.

Furthermore, at this time, as shown in FIG. 1, the resilient pieces 20B of each vibration absorbing member 20 are axially interposed between an end surface 60A of the bearing receiving portion 60 of the upper centerpiece segment 48 and an end surface 62A of the bearing receiving portion 62 of the lower centerpiece segment 50 to limit axial movement of the resilient pieces 20B of the vibration absorbing member 20. At this time, the core member 22 is spaced from the upper centerpiece segment 48 and the lower centerpiece segment 50 without making a direct contact thereto. Furthermore, the core member 22 is supported by the centerpiece 18 through the vibration absorbing members 20.

As discussed above, the vibration absorbing members 20, the core member 22 and the centerpiece 18 are assembled integrally. Then, the bearing members 56, 58 are received in the bearing receiving portions 60, 62, respectively, of the upper and lower centerpiece segments 48, 50. Then, the rotatable shaft 14 is loosely received into a hole 52A of the upper centerpiece segment 48 and is rotatably supported by the bearing members 56, 58. In this way, the rotatable shaft 14 axially extends at radially inward of the core member 22 and is supported rotatably. Next, the fitting portion 44 of the rotor housing 42 is fitted to the distal end portion of the rotatable shaft 14, so that the rotor 16 is integrally rotatably installed to the rotatable shaft 14.

Thereby, the assembly of the brushless motor 10 is completed. The above assembling process should be only considered as the example and may be modified in any appropriate manner by, for example, changing the steps of the assembling process.

The above brushless motor 10 provides the following advantages.

Specifically, in the brushless motor 10 of the first embodiment, the vibration absorbing members 20 each made from the corresponding plate are placed between the core member 22 of the stator 12 and the shaft portion 54 of the lower centerpiece segment 50 to connect therebetween. Thus, even when the torque ripple occurs during the operation of the motor to cause the circumferential vibrations of the stator 12, the circumferential vibrations of the stator 12 caused by the torque ripple can be absorbed. i.e., damped. That is, when the vibrations of the rotor 16 are conducted to the core member 22, the core member 22 is vibrated such that the core member 22 is mainly circumferentially wobbled. The vibration absorbing members 20 can absorb the vibrations of the circumferentially wobbling core member 22 applied to the vibration absorbing members 20. In this way, the circumferential vibrations of the motor main body (the stator 12 and the centerpiece 18) caused by the torque ripple are limited, so that the motor noise can be reduced without promoting the unbalanced vibrations of the motor main body.

Furthermore, in the brushless motor 10 of the first embodiment, each vibration absorbing member 20 is made of the metal plate spring. Therefore, the circumferential vibrations of the stator 12 can be more effectively absorbed, i.e., damped with the simple structure. Also, since the vibration absorbing member 20 is made of metal, the vibration absorbing effect of the vibration absorbing member 20 can be effectively implemented even in the high temperature environment.

Furthermore, in the brushless motor 10 of the first embodiment, the vibration absorbing members 20 are arranged one after another at generally equal intervals in the circumferential direction. Therefore, the circumferential vibrations of the stator 12 can be absorbed, i.e., damped in good balance.

Also, in the brushless motor 10 of the first embodiment, each vibration absorbing member 20 includes the resilient pieces 20B, each of which radially extends between the core member 22 and the shaft portion 54 such that the resilient piece 20B is resiliently deformable in the circumferential direction. Therefore, the circumferential vibrations of the stator 12 can be more effectively absorbed by the resilient pieces 20B of the vibration absorbing members 20. Furthermore, each resilient piece 20B has the corresponding axial width, i.e., extends in the axial direction, so that the vibration absorbing effect can be implemented while limiting torsion and fracture of the resilient piece 20B.

Furthermore, in the brushless motor 10 of the first embodiment, the anchors 64 are provided along the outer peripheral surface of the shaft portion 54, and the protruding end portion of the resilient piece 20B is anchored to the anchor 64 in the circumferential direction. Thus, the circumferential displacement of the vibration absorbing member 20 relative to the centerpiece 18 can be limited, and thereby the vibration absorbing effect of the vibration absorbing member 20 can be implemented.

Particularly, each anchor 64 has the support pillar 64A and the two protrusions 64C. The protruding end portion of each of the resilient pieces 20B of the vibration absorbing member 20 is anchored to the support pillar 64A and a corresponding one of the protrusions 64C of the anchor 64 at one circumferential side and the other circumferential side of the protruding end portion of the resilient piece 20B. Thus, the circumferential displacement of the vibration absorbing member 20 relative to the centerpiece 18 can be limited, and thereby the vibration absorbing effect of the vibration absorbing member 20 can be further enhanced.

Also, in the brushless motor 10 of the first embodiment, the centerpiece 18 includes the upper centerpiece segment 48 and the lower centerpiece segment 50, which are axially divided from one another, and the resilient pieces 20B of the vibration absorbing members 20 are interposed between the end surface 60A of the bearing receiving portion 60 of the upper centerpiece segment 48 and the end surface 62A of the bearing receiving portion 62 of the lower centerpiece segment 50. Thus, the axial displacement of the vibration absorbing members 20 relative to the centerpiece 18 can be limited, and thereby the vibration absorbing effect of the vibration absorbing members 20 can be implemented.

Furthermore, in the brushless motor 10 of the first embodiment, the opposing wall portions 36, which are radially opposed to the inner peripheral surface 24A of the laminated core 24, are provided in the insulator 26, and the base portion 20A of each vibration absorbing member 20 is interposed between the inner peripheral surface 24A of the laminated core 24 and the corresponding opposing wall portions 36. Thus, the radial displacement of each vibration absorbing member 20 relative to the core member 22 can be limited, and thereby the vibration absorbing effect of the vibration absorbing member 20 can be implemented.

Furthermore, in the brushless motor 10 of the first embodiment, the opposing wall portions 36 of each pair are placed one after another in the circumferential direction, and the engaging pieces 20C, which are engaged with these opposing end wall portions 36, are provided in the base portion 20A of the corresponding vibration absorbing member 20. Thus, each vibration absorbing member 20 is fixed to the core member 22 in the state where the vibration absorbing member 20 is circumferentially positioned, so that the vibration absorbing effect of the vibration absorbing member 20 can be implemented.

Furthermore, in the brushless motor 10 of the first embodiment, each opposing wall portion 36 has the stopper 38, which protrudes from the axially extending lateral edge portion 36A in the circumferential direction, and the corresponding engaging piece 20C of the corresponding vibration absorbing member 20 is axially engaged with the stopper 38. Thus, the axial displacement of the vibration absorbing member 20 relative to the core member 22 can be limited, and thereby the vibration absorbing effect of the vibration absorbing member 20 can be implemented.

Furthermore, the chamfered guide surface 38A is provided to the radially outer edge of the stopper 38. Thus, at the time of installing the vibration absorbing member 20 to the core member 22, the corresponding engaging piece 20C of the vibration absorbing member 20 is engaged to the stopper 38 such that the engaging piece 20C is slid over the guide surface 38A.

Furthermore, in the brushless motor 10 of the first embodiment, the insulator 26 includes the resilient urging pieces 40, each of which axially upwardly applies the urging force to the base portion 20A of the corresponding vibration absorbing member 20. Thus, the vibration absorbing member 20 is axially upwardly urged by the resilient urging piece 40, so that the engaging pieces 20C of the vibration absorbing member 20 are axially engaged with the stoppers 38. Therefore, rattling of the vibration absorbing member 20 in the axial direction can be limited.

Furthermore, in the brushless motor 10 of the first embodiment, each vibration absorbing member 20 is made of the thin plate spring, so that the vibration absorbing member 20 can be easily placed in the narrow space between the insulator 26 and the core member 22 and can be anchored to the interior side of the adjacent anchors 64 of the centerpiece 18. Furthermore, the vibration absorbing member 20 can be easily produced from the metal plate through the press working. Also, the vibration absorbing member 20 can be easily installed by simply pressing the vibration absorbing member 20 in the axial direction between the insulator 26 and the core member 22, thereby implementing the easy installability of the vibration absorbing member 20.

Second Embodiment

A second embodiment of the present invention will be described with reference to FIGS. 15 to 24.

In the brushless motor 110 of the second embodiment, the structure of each vibration absorbing member 120 and the structure of the core member 122 are changed from those of the brushless motor 10 of the first embodiment. In the second embodiment, the other components of the brushless motor 110 other than the vibration absorbing members 120 and the core member 122 are the same as those of the brushless motor 10 of the first embodiment and thereby will not be described further, and the same components are indicated by the same reference numerals.

Figure 15:
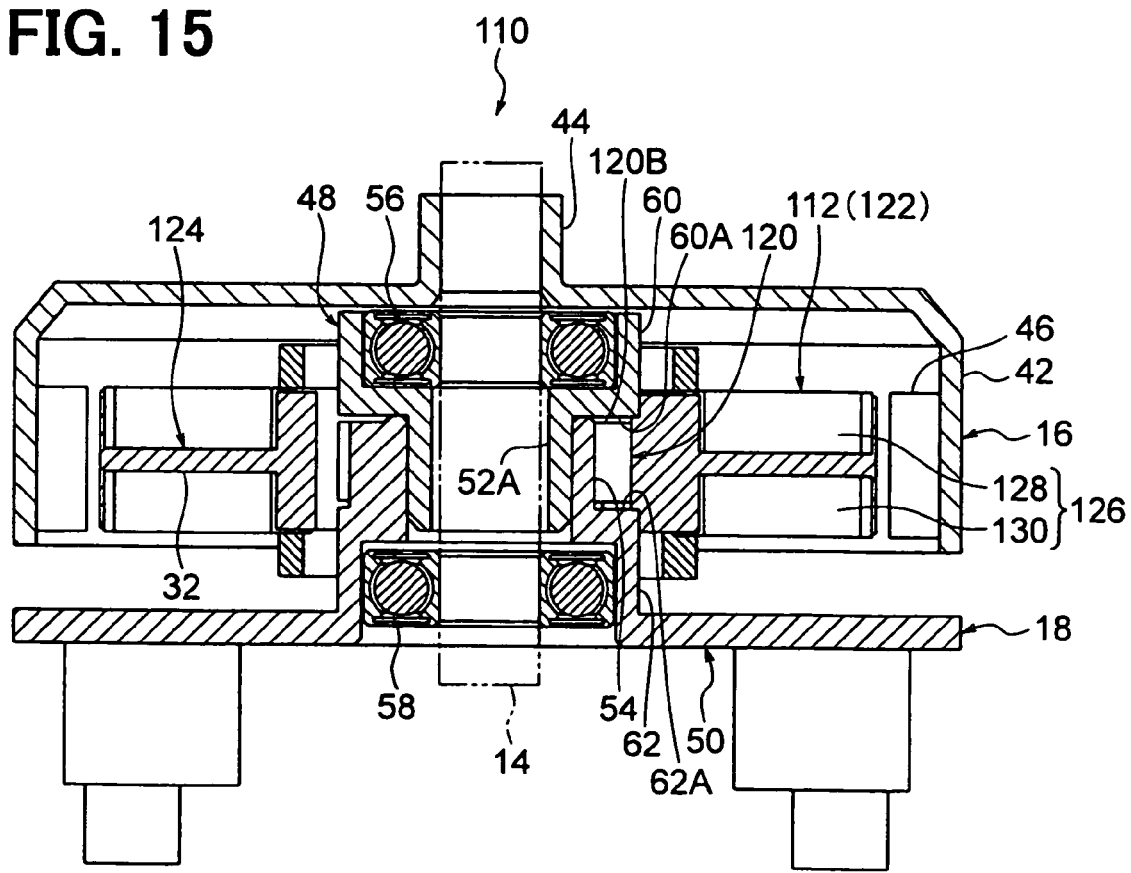
FIG. 15 is a cross sectional view of a brushless motor according to a second embodiment of the present invention.
Figure 16:
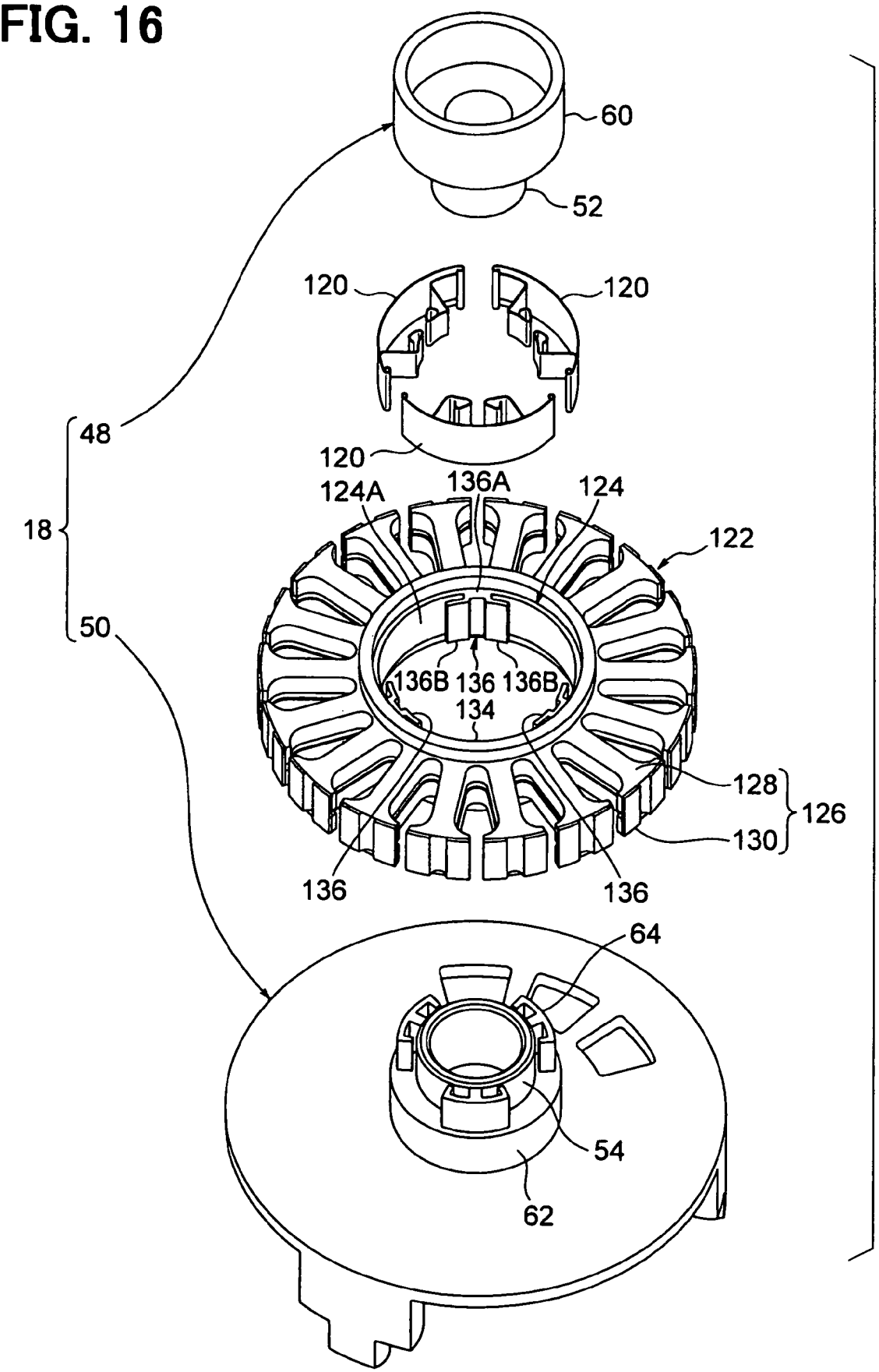
FIG. 16 is an exploded perspective view showing a part of the brushless motor shown in FIG. 15.

In the second embodiment, as shown in FIGS. 15 and 16, the core member 122 includes a laminated core 124 and an insulator 126. The insulator 126 includes an upper insulator segment 128 and a lower insulator segment 130, which are axially divided from each other and are axially installed to the laminated core 124 from opposite axial sides, respectively, of the laminated core 124. The opposing wall portions 36 and the resilient urging pieces 40 of the insulator 26 of the first embodiment are eliminated in the insulator 126.

As shown in FIG. 16, the laminated core 124 has an annular portion 134, which includes three fixing portions 136 that are arranged one after another at generally equal intervals in the circumferential direction. Each fixing portion 136 includes a base portion 136A and a pair of fixing wall portions 136B. The base portion 136A extends in the axial direction and radially inwardly protrudes. The fixing wall portions 136B extend in the circumferential direction from the base portion 136A and are radially opposed to the inner peripheral surface 124A of the laminated core 124.

Figure 17A:
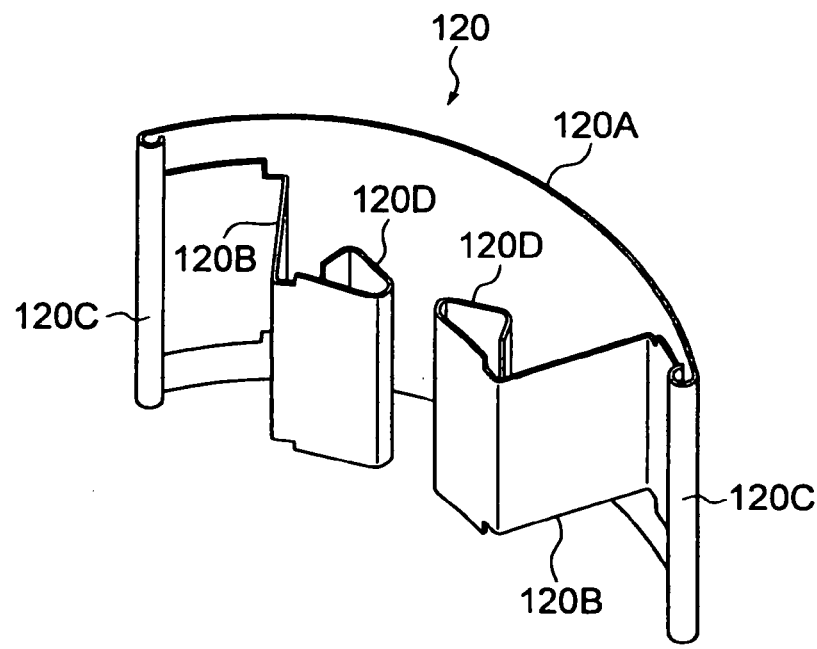
FIG. 17A is a perspective view of a vibration absorbing member of FIG. 16.
Figure 17B:
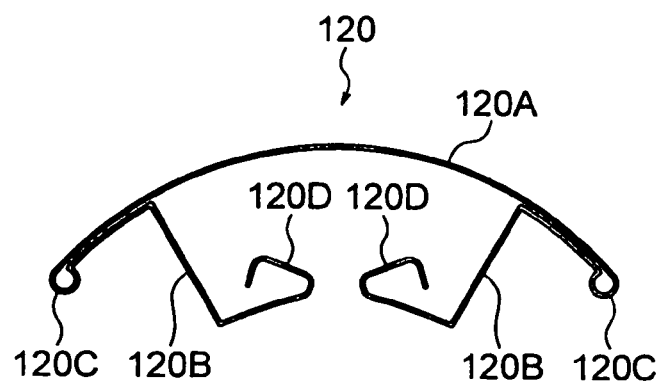
FIG. 17B is a plan view of the vibration absorbing member of FIG. 17A.
Figure 17C:
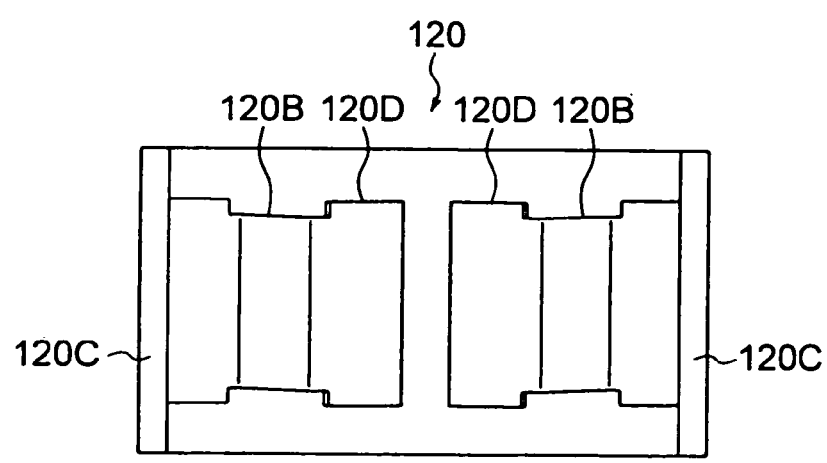
FIG. 17C is a front view of the vibration absorbing member of FIGS. 17A and 17B.

Similar to the vibration absorbing members 20 of the first embodiment, each platy vibration absorbing member (vibration damping member) 120 is made of the plate spring, which is formed by, for example, stamping a corresponding part from a metal plate through press working. As shown in FIGS. 17A to 17C, the vibration absorbing member 120 includes a base portion 120A, which extends in the circumferential direction. Two engaging portions 120C are formed at circumferential ends, respectively, of the base portion 120A such that each engaging portion 120C is folded back in the circumferential direction.

Furthermore, a resilient piece 120B is formed at the circumferentially folded part of each engaging portion 120C such that the resilient piece 120B is radially inwardly bent from the engaging portion 120C and extends in the axial direction to have the corresponding axial width. Similar to the vibration absorbing member 20 of the first embodiment, a projecting end portion of the resilient piece 120B is folded back to form an anchoring portion 120D, which is engaged with the anchor 64.

The brushless motor 110 is assembled as follows.

Figure 18:
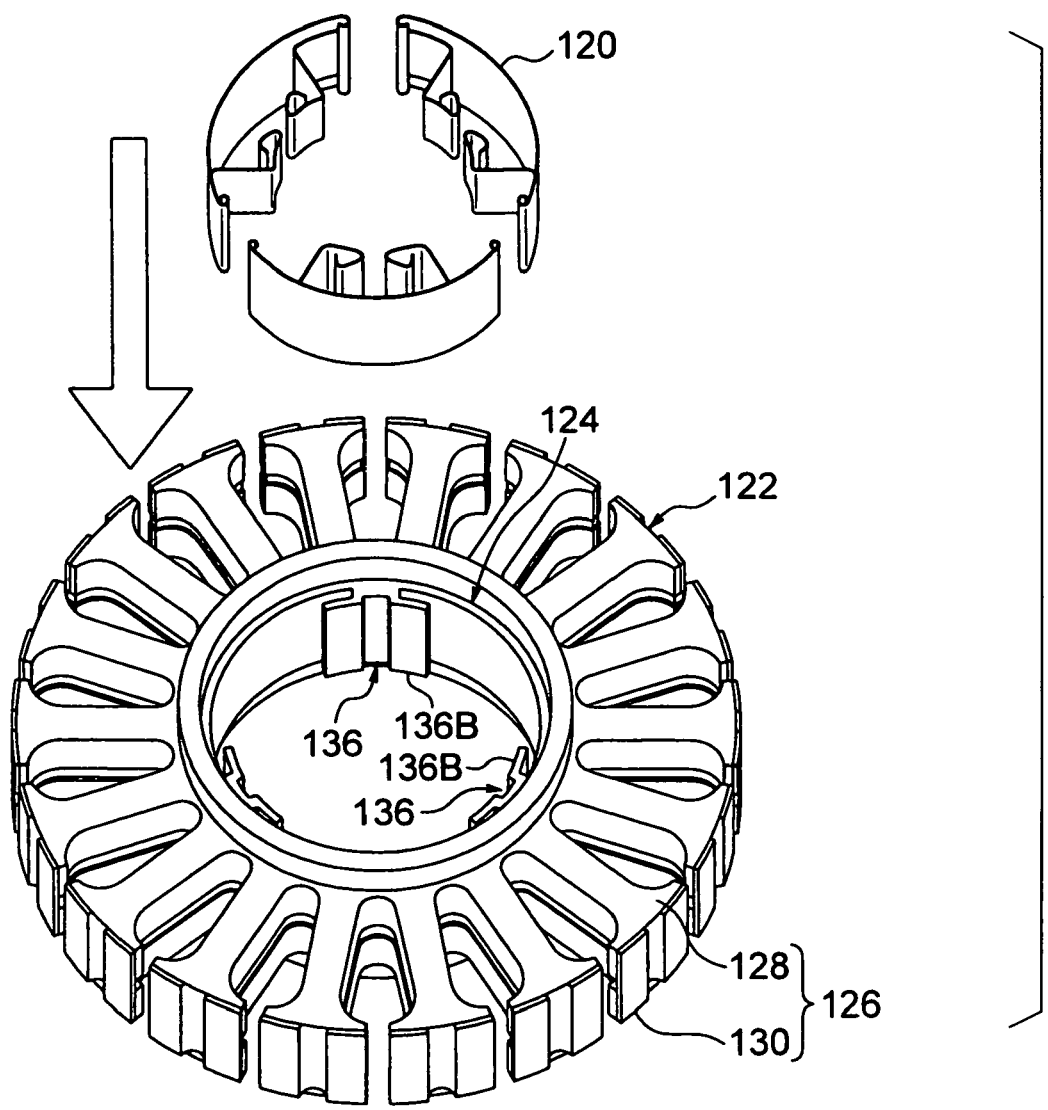
FIG. 18 is a descriptive view showing a process of installing the vibration absorbing members to the core member shown in FIG. 16.
Figure 19A:
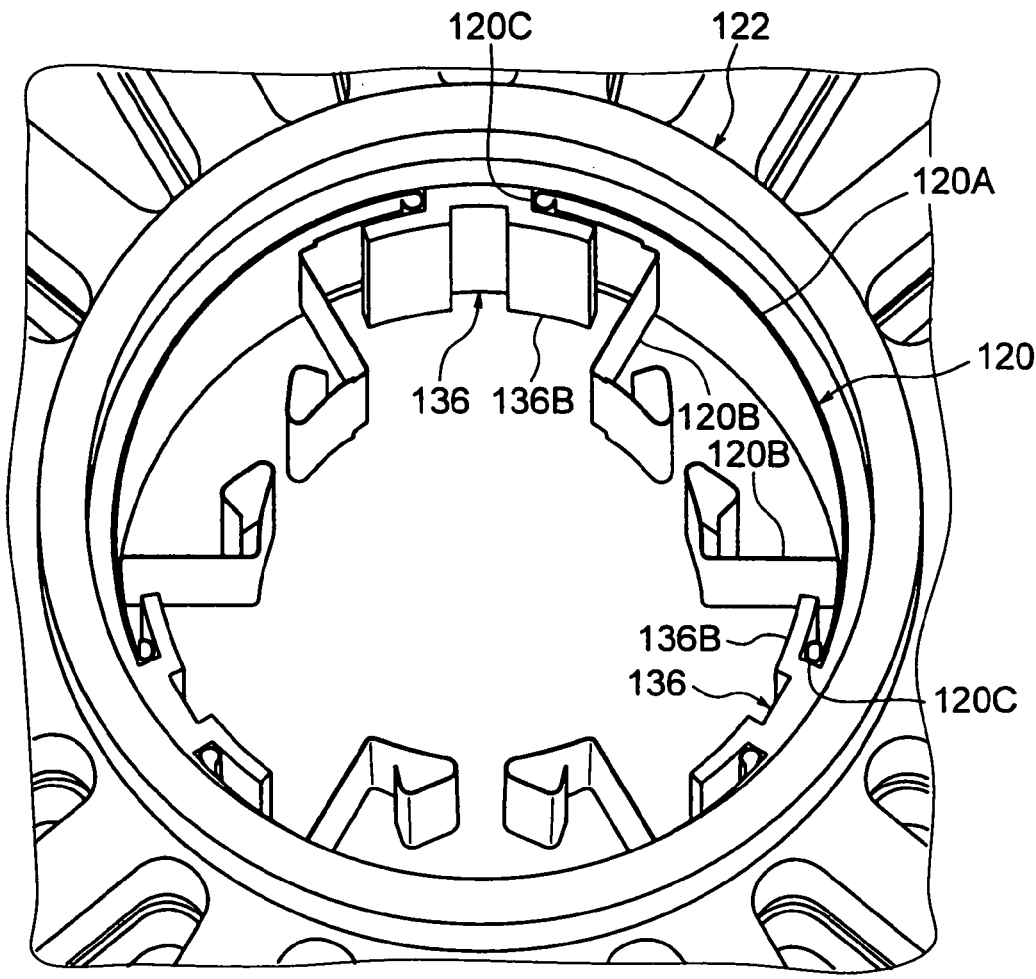
FIG. 19A is an enlarged perspective view showing the vibration absorbing members installed in the core member shown in FIG. 16.
Figure 19B:
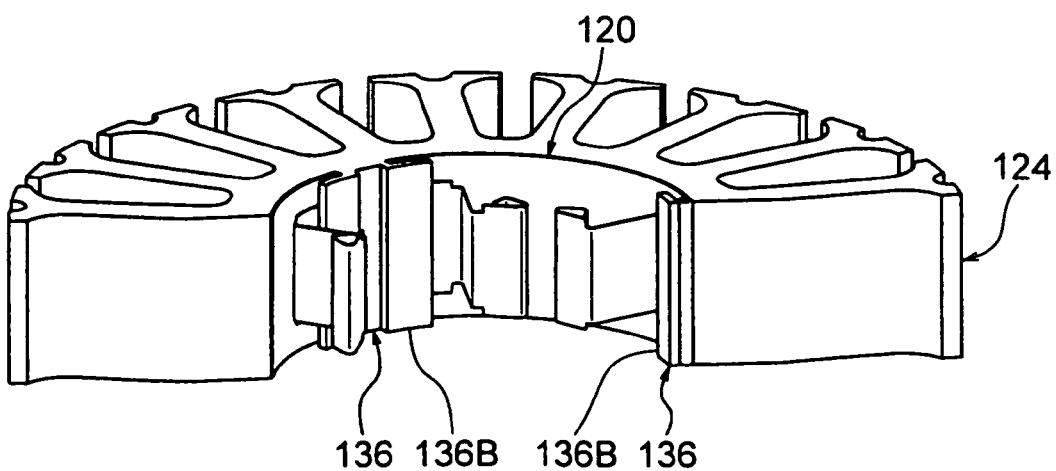
FIG. 19B is a partially fractured perspective view showing the structure of FIG. 19A.

First, as shown in FIGS. 18 to 20B, the vibration absorbing members 120 are axially downwardly installed to the core member 122, which has been previously assembled by installing the insulator 126 to the laminated core 124. At this time, first, as shown in FIGS. 18 to 19B, each vibration absorbing member 120 is placed between the corresponding adjacent fixing portions 136. Then, each engaging portion 120C of the vibration absorbing member 120 is inserted into the radial space between the inner peripheral surface 124A of the laminated core 124 and the corresponding fixing wall portion 136B of the fixing portion 136.

Figure 20A:
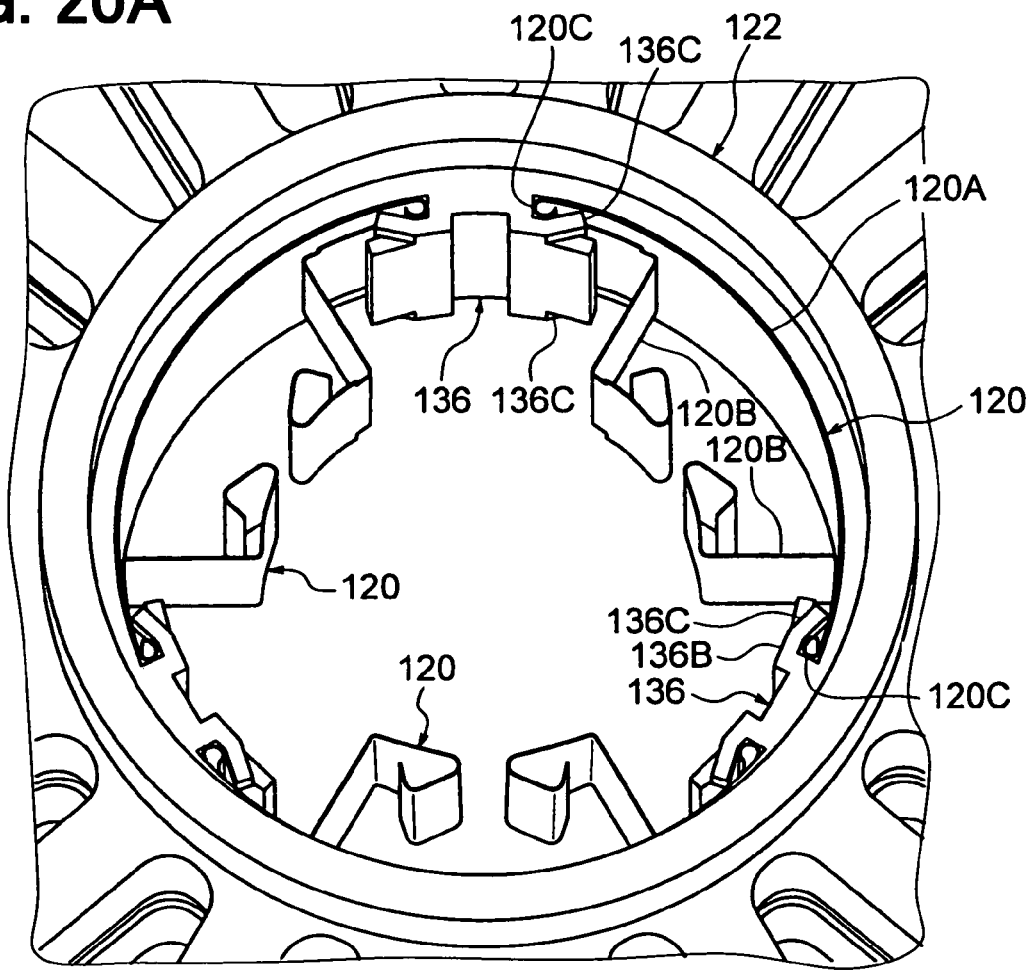
FIG. 20A is an enlarged perspective view showing the vibration absorbing members fixed to the core member by swaging, i.e., bending.
Figure 20B:
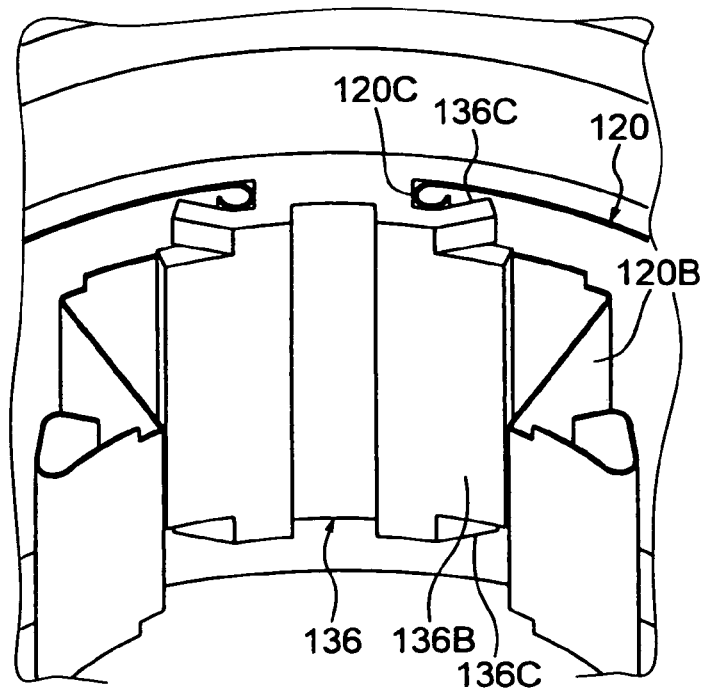
FIG. 20B is a further enlarged perspective view of a portion of FIG. 20A.

At this state, as shown in FIGS. 20A and 20B, axial end parts of each fixing wall portion 136B are radially outwardly bent, i.e., are staked. In this way, staking portions 136C are formed at the axial end parts of each fixing wall portion 136B. Thereby, the engaging portion 120C is fixed to the fixing portion 136. As a result, the movement of the vibration absorbing member 120 in the axial direction, the radial direction and the circumferential direction are all limited.

When the vibration absorbing members 120 are respectively installed to the core member 122, the vibration absorbing members 120 are arranged at generally equal intervals in the circumferential direction, as shown in FIG. 20B.

Figure 21:
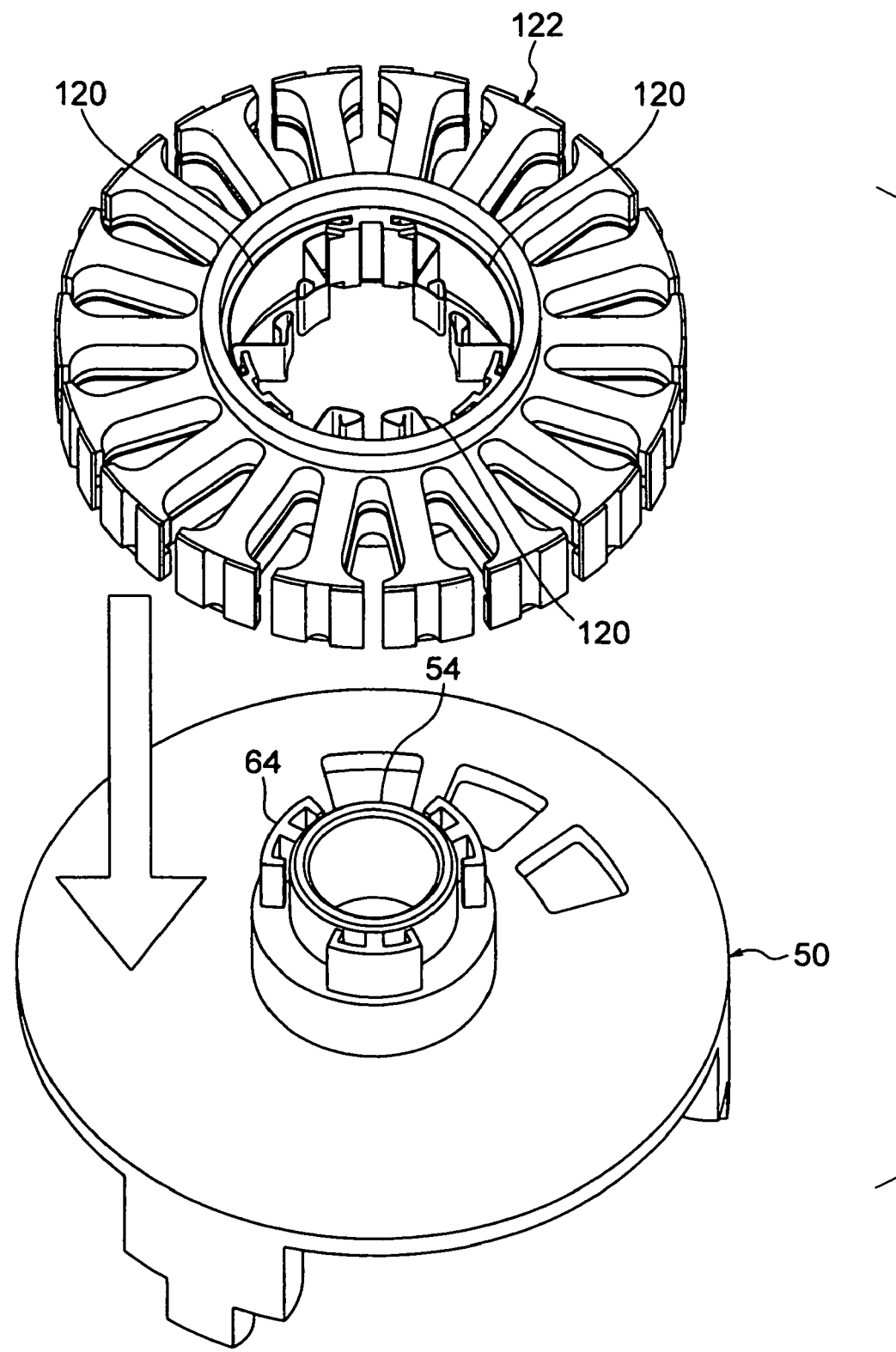
FIG. 21 is a descriptive view showing a process of installing the vibration absorbing members and the core member to the lower centerpiece segment shown in FIG. 16.
Figure 22A:
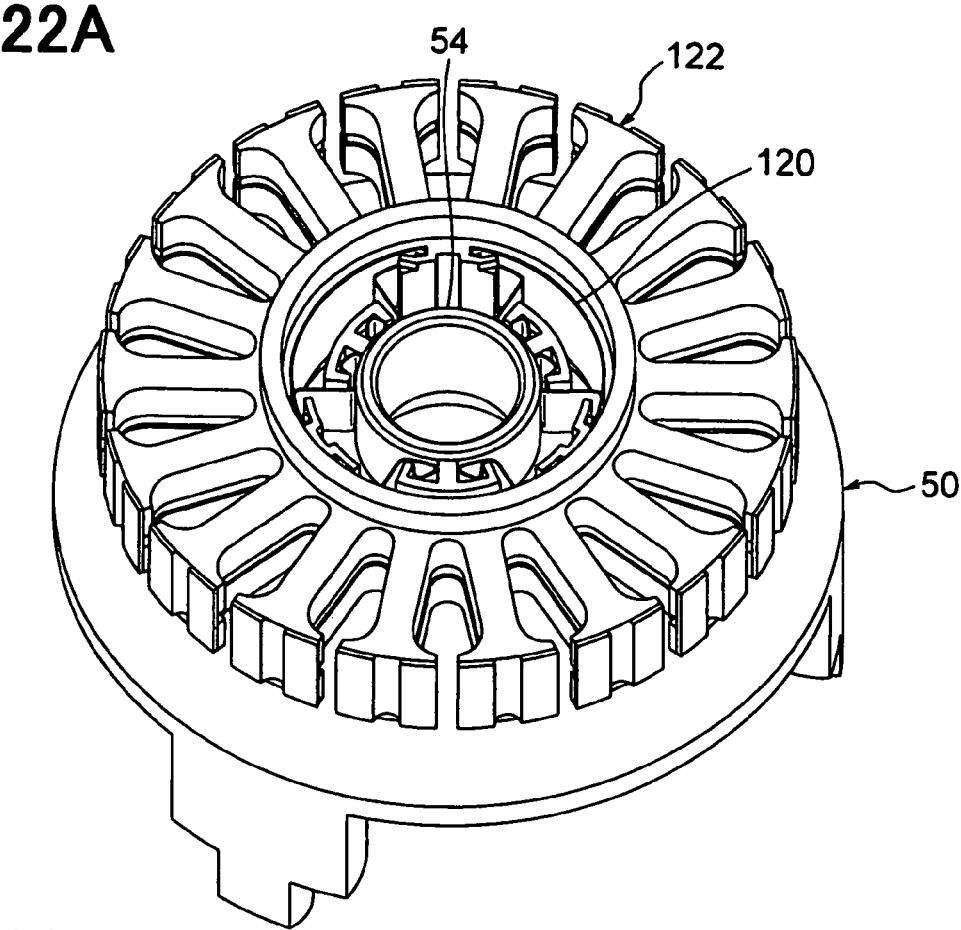
FIG. 22A is a top perspective view showing the vibration absorbing members and the core member installed to the lower centerpiece segment shown in FIG. 16.
Figure 22B:
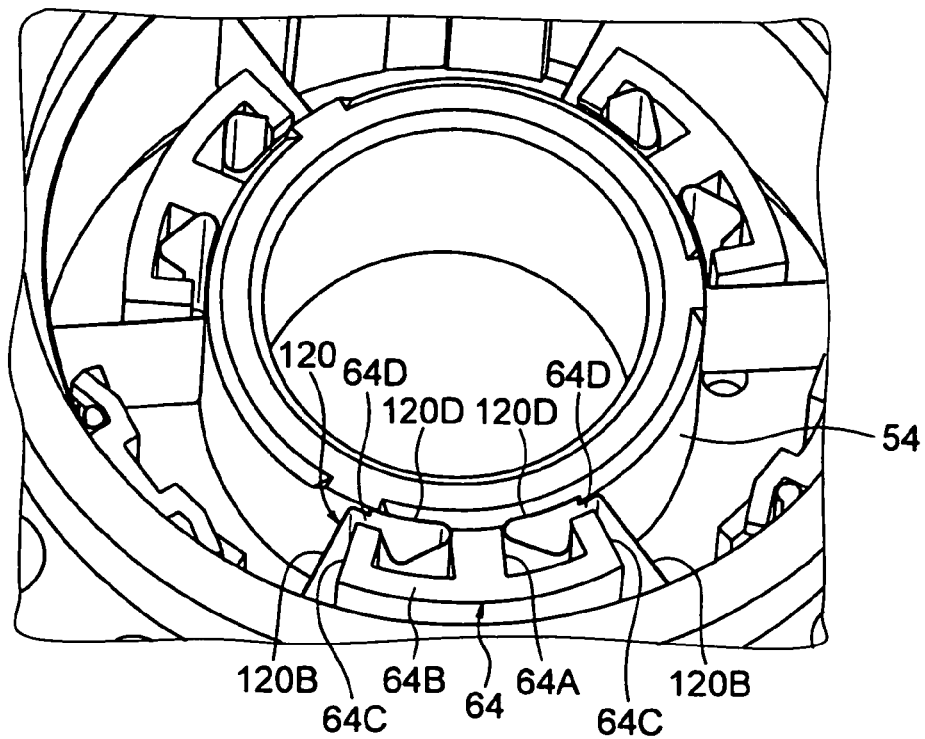
FIG. 22B is an enlarged perspective view showing a portion of FIG. 22A.

Next, the core member 122, to which the vibration absorbing members 120 are installed, is installed to the lower centerpiece segment 50 from the axially upward thereof, as shown in FIG. 21. At this time, as shown in FIGS. 22A and 22B, the shaft portion 54 of the lower centerpiece segment 50 is placed radially inward of the core member 122, and each of the anchoring portions 120D, which are provided at the protruding end portions of the resilient pieces 120B of each vibration absorbing member 120, is inserted into a corresponding space, which is defined by the support pillar 64A, the circumferential wall 64B and the corresponding protrusion 64C of the corresponding anchor 64 formed in the shaft portion 54.

In this way, each anchoring portion 120D is engaged with the support pillar 64A and the protrusion 64C at one circumferential side and the other circumferential side of the anchoring portion 120D and is also engaged with the circumferential wall 64B and the outer peripheral surface of the shaft portion 54 at a radially outer side and a radially inner side, respectively, of the anchoring portion 120D. Furthermore, at this time, the resilient piece 120B, which has the corresponding axial width, is radially placed between the core member 122 and the shaft portion 54 to connect therebetween while the resilient piece 120B radially extends such that the resilient piece 120B is resiliently deformable in the circumferential direction to absorb the circumferential vibrations transmitted from the core member 122.

Figure 23:
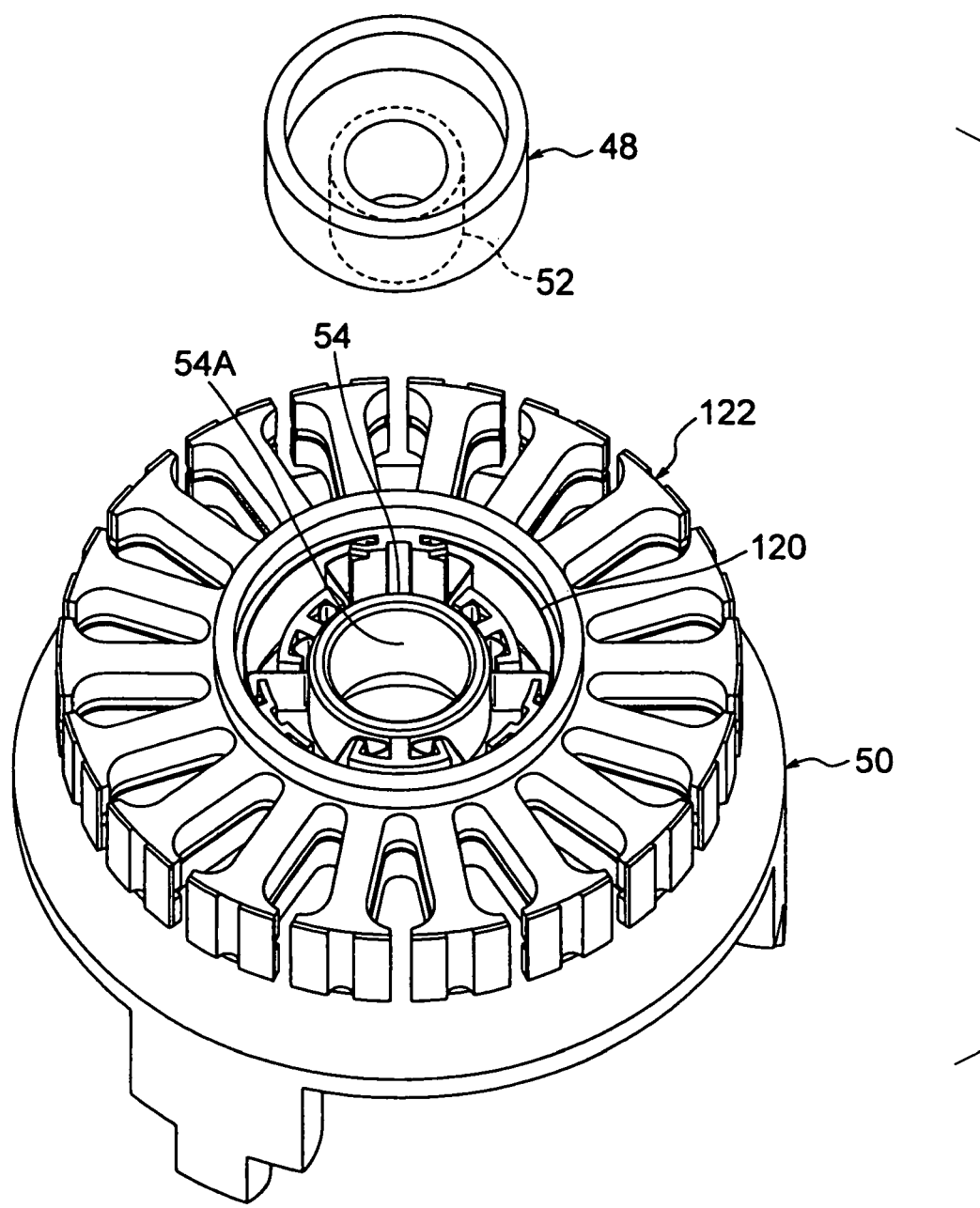
FIG. 23 is a descriptive view showing a process of installing an upper centerpiece segment to the vibration absorbing members, the core member and the lower centerpiece segment shown in FIG. 16.
Figure 24:
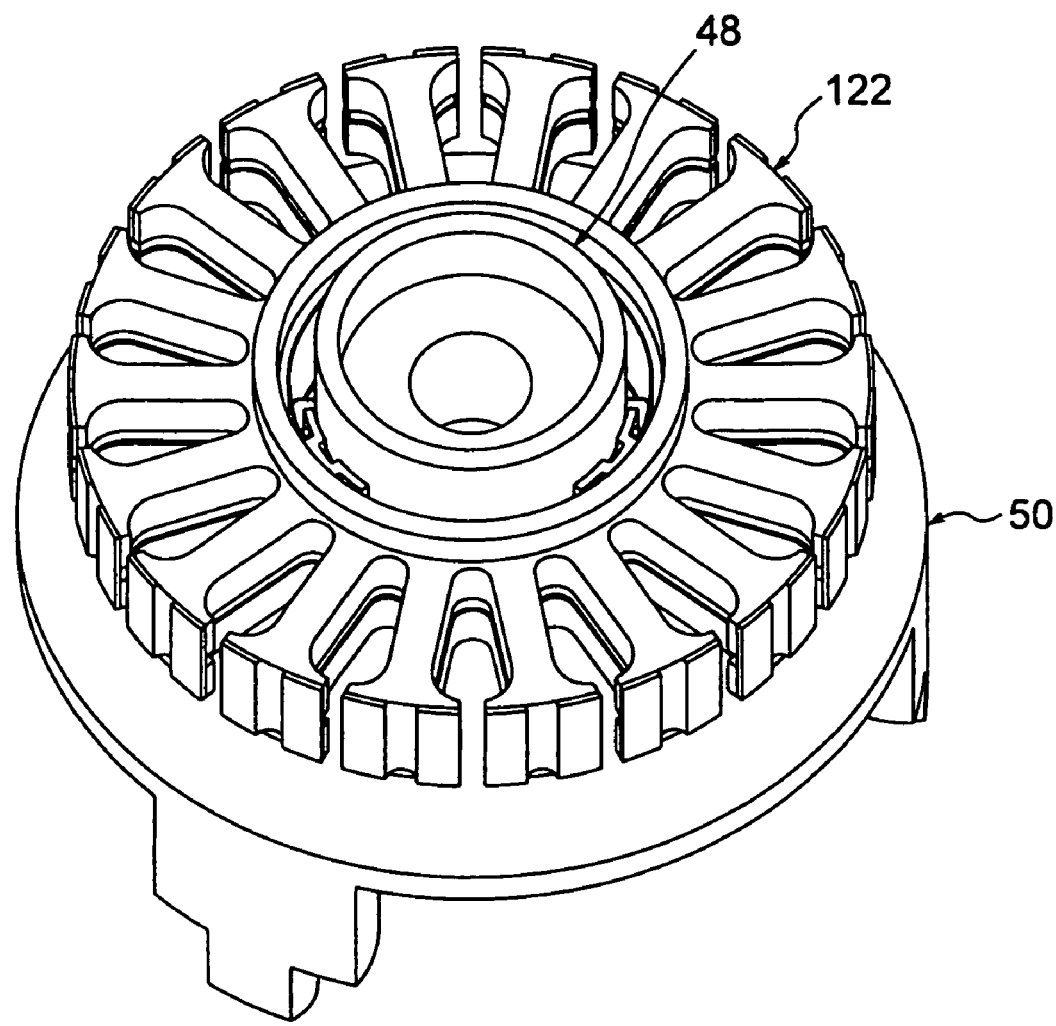
FIG. 24 is a perspective view showing the upper centerpiece segment installed to the vibration absorbing members, the core member and the lower centerpiece segment shown in FIG. 16.

Then, as shown in FIG. 23, the upper centerpiece segment 48 is installed to the lower centerpiece segment 50, which has the core member 122 installed thereto, from the axially upper side of the lower centerpiece segment 50. At this time, the shaft portion 52 of the upper centerpiece segment 48 is press fitted into the hole 54A of the shaft portion 54 of the lower centerpiece segment 50. In this way, as shown in FIG. 24, the upper centerpiece segment 48 is integrally fixed to the lower centerpiece segment 50.

Furthermore, at this time, as shown in FIG. 15, the resilient pieces 120B of each vibration absorbing member 120 are axially interposed between the end surface 60A of the bearing receiving portion 60 of the upper centerpiece segment 48 and the end surface 62A of the bearing receiving portion 62 of the lower centerpiece segment 50 to limit axial movement of the resilient pieces 120B of the vibration absorbing member 120. At this time, the core member 122 is spaced from the upper centerpiece segment 48 and the lower centerpiece segment 50 without making a direct contact thereto. Furthermore, the core member 122 is supported by the centerpiece 18 through the vibration absorbing members 120.

As discussed above, the vibration absorbing members 120, the core member 122 and the centerpiece 18 are assembled integrally. Then, the bearing members 56, 58 are received in the bearing receiving portions 60, 62, respectively, of the upper and lower centerpiece segments 48, 50, and the rotatable shaft 14 is loosely received into the hole 52A of the upper centerpiece segment 48 and is rotatably supported by the bearing members 56, 58. In this way, the rotatable shaft 14 axially extends at radially inward of the core member 22 and is supported rotatably. Next, the fitting portion 44 of the rotor housing 42 is fitted to the distal end portion of the rotatable shaft 14, so that the rotor 16 is integrally rotatably installed to the rotatable shaft 14.

Thereby, the assembly of the brushless motor 110 is completed. The above assembling process should be only considered as the example and may be modified in any appropriate manner by, for example, changing the steps of the assembling process.

The above brushless motor 110 provides the following advantages.

Specifically, in the brushless motor 110 of the second embodiment, the vibration absorbing members 120 each made from the corresponding plate are placed between the core member 122 of the stator 112 and the shaft portion 54 of the lower centerpiece segment 50 to connect therebetween. Thus, even when a torque ripple occurs during the operation of the motor to cause the circumferential vibrations of the stator 112, the circumferential vibrations of the stator 112 caused by the torque ripple can be absorbed, i.e., damped. That is, when the vibrations of the rotor 16 are conducted to the core member 122, the core member 122 is vibrated such that the core member 122 is mainly circumferentially wobbled. The vibration absorbing members 120 can absorb the vibrations of the circumferentially wobbling core member 122 applied to the vibration absorbing members 120. In this way, the circumferential vibrations of the motor main body (the stator 112 and the centerpiece 18) caused by the torque ripple are limited, so that the motor noise can be reduced without promoting the unbalanced vibrations of the motor main body.

Furthermore, in the brushless motor 110 of the second embodiment, each vibration absorbing member 120 is made of the metal plate spring. Therefore, the circumferential vibrations of the stator 112 can be more effectively absorbed, i.e., damped with the simple structure. Also, since the vibration absorbing member 120 is made of metal, the vibration absorbing effect of the vibration absorbing member 120 can be effectively implemented even in the high temperature environment.

Furthermore, in the brushless motor 110 of the second embodiment, the vibration absorbing members 120 are arranged one after another at generally equal intervals in the circumferential direction. Therefore, the circumferential vibrations of the stator 112 can be absorbed, i.e., damped in good balance.

Also, in the brushless motor 110 of the second embodiment, each vibration absorbing member 120 includes the resilient pieces 120B, each of which radially extends between the core member 122 and the shaft portion 54 such that the resilient piece 120B is resiliently deformable in the circumferential direction. Therefore, the circumferential vibrations of the stator 112 can be more effectively absorbed by the resilient pieces 120B of the vibration absorbing members 120. Furthermore, each resilient piece 120B has the corresponding axial width, i.e., extends in the axial direction, so that the vibration absorbing effect can be implemented while limiting torsion and fracture of the resilient piece 120B.

Furthermore, in the brushless motor 110 of the second embodiment, similar to the brushless motor of the first embodiment, the anchors 64 are provided along the outer peripheral surface of the shaft portion 54, and the protruding end portion of the resilient piece 120B is anchored to the anchor 64 in the circumferential direction. Thus, the circumferential displacement of the vibration absorbing members 120 relative to the centerpiece 18 can be limited, and thereby the vibration absorbing effect of the vibration absorbing members 120 can be implemented.

Particularly, each anchor 64 has the support pillar 64A and the protrusions 64C, which are circumferentially engaged with the protruding end portions of the corresponding resilient pieces 120B. Thus, the circumferential displacement of the vibration absorbing member 120 relative to the centerpiece 18 can be limited, and thereby the vibration absorbing effect of the vibration absorbing member 120 can be further enhanced.

Furthermore, the centerpiece 18 includes the upper centerpiece segment 48 and the lower centerpiece segment 50, which are axially divided from one another, and the resilient pieces 120B of the vibration absorbing members 120 are interposed between the end surface 60A of the bearing receiving portion 60 of the upper centerpiece segment 48 and the end surface 62A of the bearing receiving portion 62 of the lower centerpiece segment 50. Thus, the axial displacement of the vibration absorbing members 120 relative to the centerpiece 18 can be limited, and thereby the vibration absorbing effect of the vibration absorbing members 120 can be implemented.

Furthermore, in the brushless motor 110 of the second embodiment, the fixing portions 136 are provided to the annular portion 134 of the laminated core 124, and each fixing portion 136 includes the fixing wall portions 136B, which extend from the base portion 136A in the circumferential direction and are opposed to the inner peripheral surface 124A of the laminated core 124 in the radial direction. Each of the engaging portions 120C, which are provided to the circumferential ends of the base portion 120A of the vibration absorbing member 120, is interposed between the inner peripheral surface 124A of the laminated core 124 and the corresponding fixing wall portion 136B. Thus, the radial displacement of the vibration absorbing member 120 relative to the core member 122 can be limited.

Furthermore, the axial end parts of the fixing wall portion 136B are radially outwardly bent to form the swaging portions 136C. Thus, the axial displacement of the vibration absorbing member 120 relative to the core member 122 can be also limited. In addition, each engaging portion 120C of the vibration absorbing member 120 is engaged to the base portion 136A of the corresponding fixing portion 136 in the circumferential direction. Thus, the circumferential displacement of the vibration absorbing member 120 relative to the core member 122 can be also limited. In this way, the vibration absorbing effect of the vibration absorbing member 120 can be implemented.

Furthermore, in the brushless motor 110 of the second embodiment, each vibration absorbing member 120 is made of the thin plate spring, so that the vibration absorbing member 120 can be easily placed in the narrow space between the insulator 126 and the core member 122 and can be anchored to the interior side of the adjacent anchors 64 of the centerpiece 18. Furthermore, the vibration absorbing member 120 can be easily produced from the metal plate through the press working. Also, the vibration absorbing member 120 can be easily installed by simply pressing the vibration absorbing member 120 in the axial direction relative to the laminated core 124.

Third Embodiment

A third embodiment of the present invention will be described with reference to FIGS. 25A to 28C.

The brushless motor of the third embodiment is formed by adding resilient members 200 to each vibration absorbing member 120 of the brushless motor 110 of the second embodiment. The other components of the brushless motor of the third embodiment other than the resilient members 200 are the same as those of the second embodiment and will not be described further. Also, the components, which are similar to those of the second embodiment will be indicated by the same reference numerals. Furthermore, the entire structure of the brushless motor of the third embodiment is similar to that of FIG. 15.

Figure 25A:
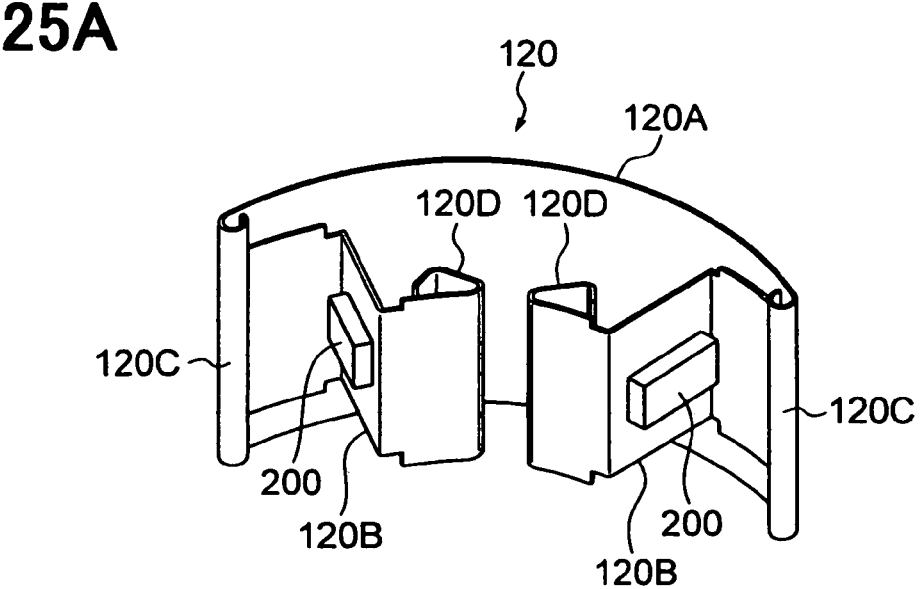
FIG. 25A is a perspective view of a vibration absorbing member having resilient members installed in a brushless motor according to a third embodiment of the present invention.
Figure 25B:
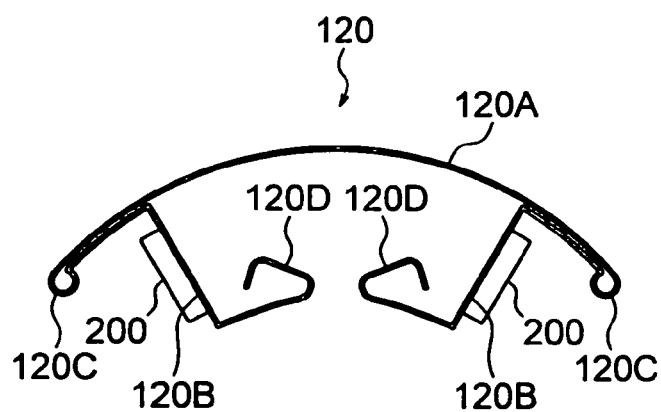
FIG. 25B is a plan view showing the structure of FIG. 25A.
Figure 25C:
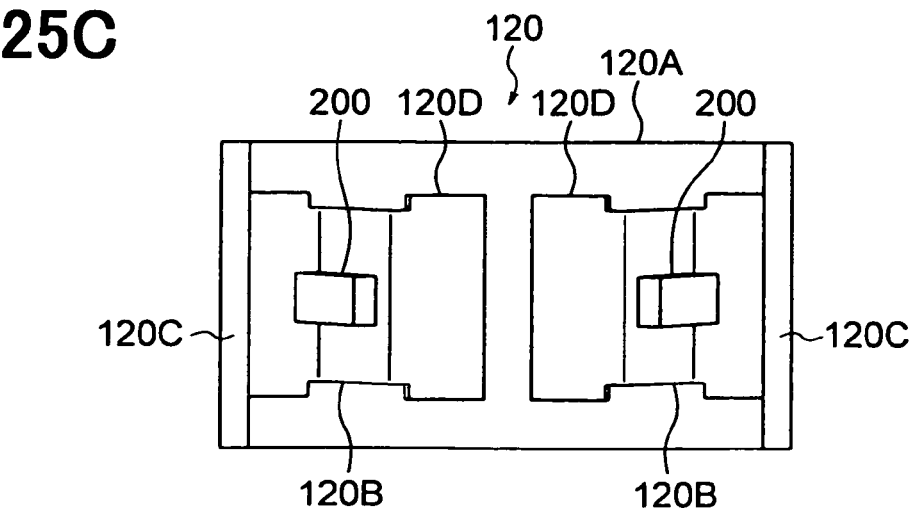
FIG. 25C is a front view showing the structure of FIGS. 25A and 25B.

As shown in FIGS. 25A to 25C, the resilient member 200, which is formed as a rectangular parallelepiped that extends in the radial direction, is fixed to each resilient piece 120B of each vibration absorbing member 120. The resilient member 200 is made of, for example, a rubber member or a sponge and has damping characteristics, which are different from those of the metal vibration absorbing member 120.

The above brushless motor provides the following advantages.

That is, in the brushless motor of the third embodiment, the vibration absorbing member 120 integrally includes the resilient members 200, which have the damping characteristics that are different from those of the vibration absorbing member 120. Thus, for example, even in the case where the vibration absorbing member 120 is vibrated at the time of absorbing the circumferential vibrations of the stator 112 caused by the torque ripple or in the case where the vibration absorbing member 120 is vibrated in the non-operational state of the brushless motor, the vibrations of the vibration absorbing member 120 can be effectively absorbed, i.e., damped by the resilient members 200.

In the third embodiment, the effects and advantages, which are implemented by the components similar to those of the second embodiment, should be referred to the second embodiment and will not be described further.

In the above embodiment, the resilient member 200 is fixed to the resilient piece 120B of the vibration absorbing member 120 such that the resilient member 200 extends in the radial direction. However, it should be understood that, for example, the number, the shape and the location of the resilient member 200 can be modified in various ways.

Figure 26A:
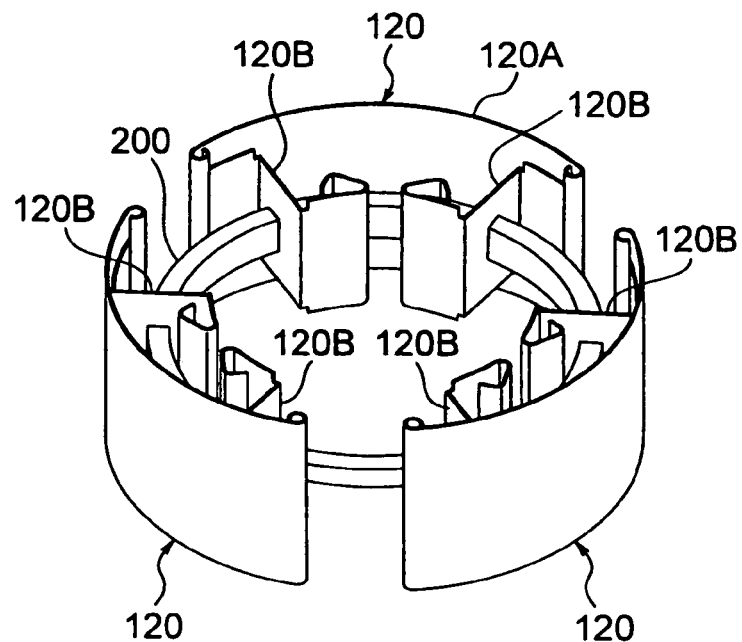
FIG. 26A is a perspective view of showing a first modification of the resilient member shown in FIGS. 25A to 25C.
Figure 26B:
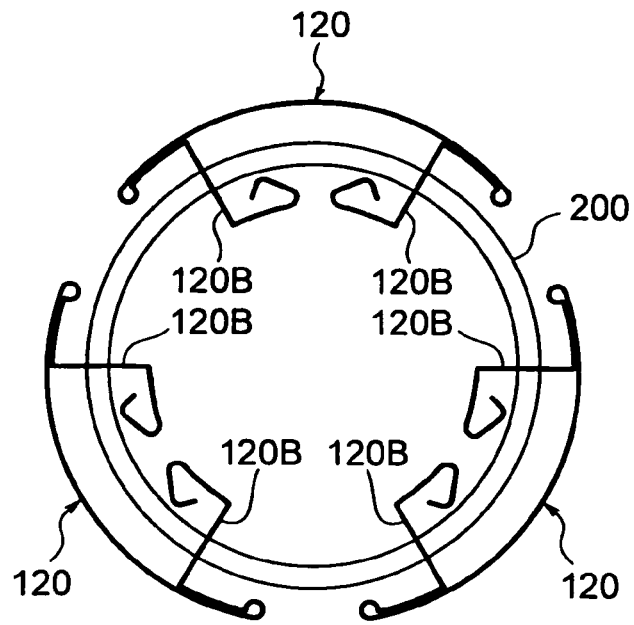
FIG. 26B is a plan view showing the structure of FIG. 26A.
Figure 26C:
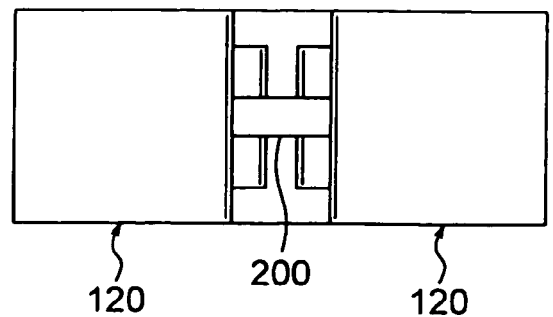
FIG. 26C is a front view showing the structure of FIGS. 26A and 26B.

For example, as shown in FIGS. 26A to 26C, the resilient member 200 may be formed as an annular member that extends in the circumferential direction and penetrates through the resilient pieces 120B of the vibration absorbing members 120.

Figure 27A:
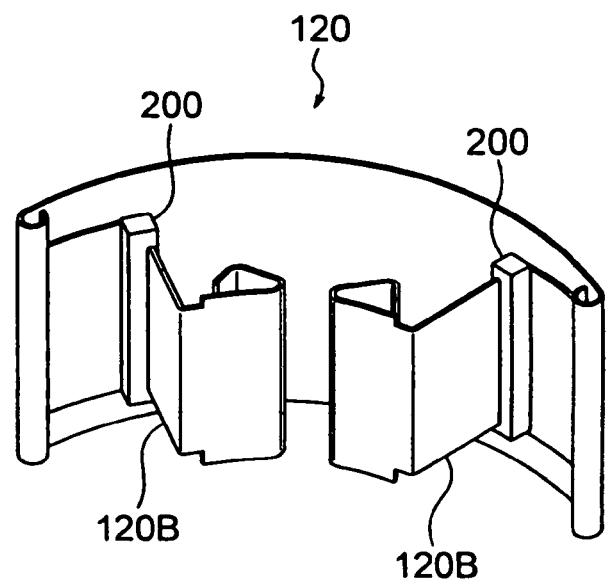
FIG. 27A is a perspective view showing a second modification of the resilient member shown in FIGS. 25A to 25C.
Figure 27B:
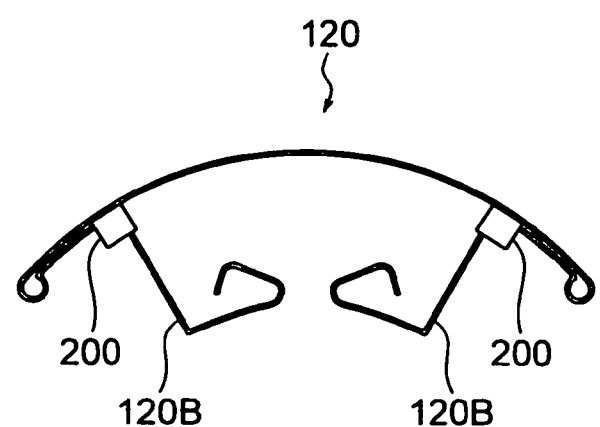
FIG. 27B is a plan view showing the structure of FIG. 27A.
Figure 27C:
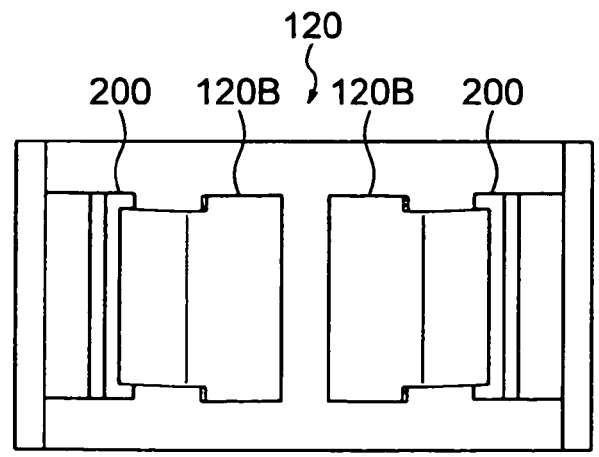
FIG. 27C is a front view showing the structure of FIGS. 27A and 27B.

Furthermore, as shown in FIGS. 27A to 27C, the resilient member 200 may be fixed to a root of each resilient piece 120B of each vibration absorbing member 120 to extend in the axial direction. Here, the resilient piece 120B may penetrate through the resilient member 200.

Figure 28A:
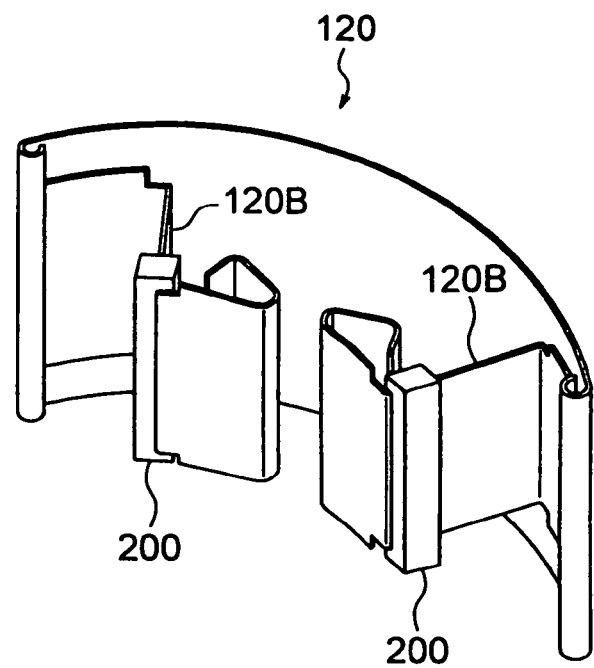
FIG. 28A is a perspective view of showing a third modification of the resilient member shown in FIGS. 25A to 25C.
Figure 28B:
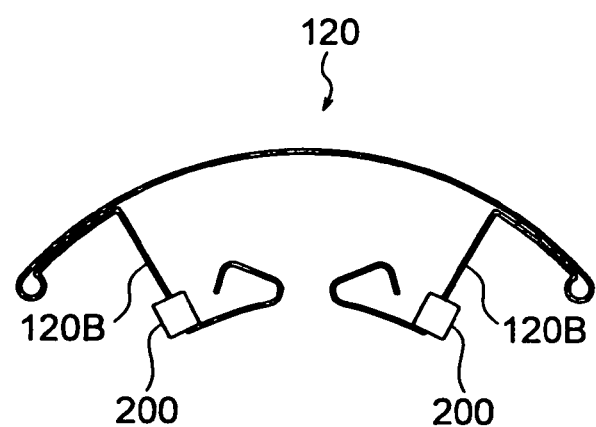
FIG. 28B is a plan view showing the structure of FIG. 28A.
Figure 28C:
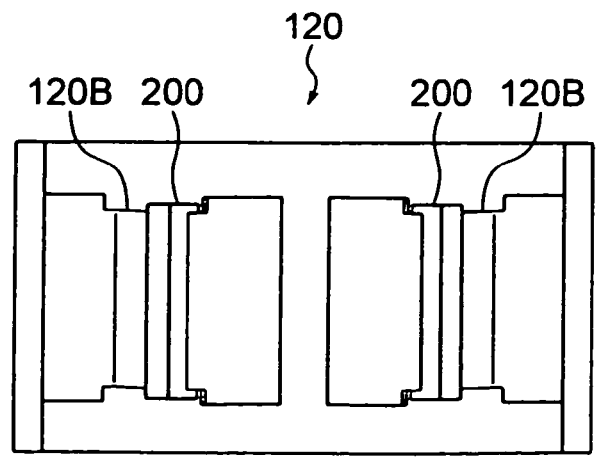
FIG. 28C is a front view showing the structure of FIGS. 28A and 28B.

Furthermore, as shown in FIGS. 28A to 28C, the resilient member 200 may be fixed to a protruding end portion of each resilient piece 120B of each vibration absorbing member 120 to extend in the axial direction. Here, similar the above example, the resilient piece 120B may penetrate through the resilient member 200.

Furthermore, in the above embodiment, the resilient member 200 is provided to the vibration absorbing member 120 of the second embodiment. Alternatively, the resilient member 200 may be provided to the vibration absorbing member 20 of the first embodiment.

Additional advantages and modifications will readily occur to those skilled in the art. The invention in its broader terms is therefore not limited to the specific details, representative apparatus, and illustrative examples shown and described.

What is claimed is:

1. A brushless motor comprising:
a stator that includes an annular core member;
a rotatable shaft that is placed radially inward of the core member and extends in an axial direction;
a rotor that is supported by the rotatable shaft;
a centerpiece that supports the core member and includes a center portion, which is placed radially inward of the core member; and
a platy vibration absorbing member that connects between the core member and the center portion of the centerpiece and damps circumferential vibrations transmitted from the core member.

2. The brushless motor according to claim 1, wherein the vibration absorbing member is one of a plurality of platy vibration absorbing members, which are arranged one after another at generally equal intervals in a circumferential direction.

3. The brushless motor according to claim 1, wherein:
the vibration absorbing member includes a resilient piece, which is placed radially between the core member and the center portion of the centerpiece and has an axial width; and
the resilient piece radially extends and is resiliently deformable in a circumferential direction.

4. The brushless motor according to claim 3, wherein:
the center portion of the centerpiece includes an anchor in an outer peripheral surface of the center portion; and
a protruding end portion of the resilient piece of the vibration absorbing member is anchored to the anchor in the circumferential direction.

5. The brushless motor according to claim 4, wherein the anchor includes a primary anchoring portion and a secondary anchoring portion, which are anchored with the protruding end portion of the resilient piece at one circumferential side and the other circumferential side of the protruding end portion of the resilient piece.

6. The brushless motor according to claim 1, wherein:

the centerpiece includes a first centerpiece segment and a second centerpiece segment, which are axially divided from one another; and at least a portion of the vibration absorbing member is axially interposed between the first centerpiece segment and the second centerpiece segment.

7. The brushless motor according to claim 1, wherein:

the core member includes a laminated core and an insulator;

the insulator covers the laminated core and includes an opposing wall portion, which is radially opposed to an inner peripheral surface of the laminated core; and a base portion of the vibration absorbing member is interposed between the inner peripheral surface of the laminated core and the opposing wall portion.

8. The brushless motor according to claim 7, wherein:

the opposing wall portion is one of two opposing wall portions, which are placed one after another in a circumferential direction; and the base portion of the vibration absorbing member includes at least one engaging piece that is engaged between the opposing wall portions.

9. The brushless motor according to claim 8, wherein:

each opposing wall portion has a stopper, which circumferentially projects from a lateral edge portion of the opposing wall portion, which extends in the axial direction;

the stoppers of the opposing wall portions axially engage the at least one engaging piece of the vibration absorbing member; and a chamfered guide surface is formed at an edge portion of each stopper, which is located at a projecting end side and a radially outer side of the stopper.

10. The brushless motor according to claim 9, wherein the insulator includes a resilient urging piece, which applies an axial urging force to the base portion of the vibration absorbing member.

11. The brushless motor according to claim 1, wherein:

the core member includes a laminated core and an insulator;

the insulator covers the laminated core;

the laminated core includes a fixing wall portion at an inner peripheral surface of the laminated core;

a base portion of the vibration absorbing member is radially placed between the inner peripheral surface of the laminated core and the fixing wall portion; and an axial end portion of the fixing wall portion is radially outwardly bent relative to an adjacent area thereof, which is adjacent to the axial end portion of the fixing wall portion.

12. The brushless motor according to claim 1, wherein a resilient member, which has damping characteristics that are different from those of the vibration absorbing member, is provided integrally to the vibration absorbing member.

13. The brushless motor according to claim 1, wherein the vibration absorbing member is made of a metal plate spring.

* * * * *